United States Patent
Yang

(10) Patent No.: US 11,850,749 B2
(45) Date of Patent: Dec. 26, 2023

(54) MODULAR ROBOT, SYSTEM THEREOF, CONTROL METHOD FOR MODULAR ROBOT

(71) Applicant: Beijing KEYi Technology Co., Ltd., Beijing (CN)

(72) Inventor: Jianbo Yang, Beijing (CN)

(73) Assignee: BEIJING KEYI TECHNOLOGY CO., LTD., Beijing (CN)

( * ) Notice: Subject to any disclaimer, the term of this patent is extended or adjusted under 35 U.S.C. 154(b) by 793 days.

(21) Appl. No.: 16/905,906

(22) PCT Filed: Dec. 17, 2018

(86) PCT No.: PCT/CN2018/121442
§ 371 (c)(1),
(2) Date: Feb. 8, 2021

(87) PCT Pub. No.: WO2019/120155
PCT Pub. Date: Jun. 27, 2019

(65) Prior Publication Data
US 2021/0162585 A1     Jun. 3, 2021

(30) Foreign Application Priority Data
Dec. 19, 2017 (CN) .......................... 201711378221.2

(51) Int. Cl.
*B25J 9/16* (2006.01)
*B25J 9/08* (2006.01)
*B25J 13/08* (2006.01)

(52) U.S. Cl.
CPC .............. *B25J 9/1617* (2013.01); *B25J 9/08* (2013.01); *B25J 9/1656* (2013.01); *B25J 13/088* (2013.01)

(58) Field of Classification Search
CPC . B25J 9/1617; B25J 9/08; B25J 9/1656; B25J 13/088; B25J 9/1605; B25J 9/161;
(Continued)

(56) References Cited

U.S. PATENT DOCUMENTS

| 4,973,215 A | * | 11/1990 | Karlen ....................... B25J 9/04 901/15 |
| 6,636,781 B1 | * | 10/2003 | Shen ....................... B08B 9/045 703/2 |

(Continued)

FOREIGN PATENT DOCUMENTS

| CN | 103942937 A | 7/2014 |
| CN | 105172932 A | 12/2015 |

(Continued)

*Primary Examiner* — Jonathan L Sample
*Assistant Examiner* — Byron Xavier Kasper
(74) *Attorney, Agent, or Firm* — Andrew C. Cheng

(57) ABSTRACT

The present invention provides a modular robot. The module robot includes at least two unit modules, each unit module includes at least one subunit module, and the subunit module includes at least two connected submodules; the two submodules can be controlled by electrical signals to rotate relatively, to change the modular robot configuration, and every unit module provides at least a docking part, the unit modules are connected through the docking part; different docking parts of every unit module have interface identification information, interface identification information of every docking part can be recognized, and the position information of the unit module is obtained by recognizing interface identification information of docking parts of connected unit modules. The present invention further provides the modular robot system and modular robot control method. The modular robot has advantages of simple recognition of position information and high degree of intelligence.

11 Claims, 14 Drawing Sheets

(58) Field of Classification Search
CPC .......... B25J 9/1612; B25J 9/1653; B25J 9/00;
G05B 2219/40304; G05B 2219/25314;
G05B 2219/31075; G05B 2219/31044;
G05B 2219/34205; G05B 2219/40302;
G05B 2219/39146; G05B 2219/39163;
A63H 33/04; A63H 33/042
See application file for complete search history.

(56) References Cited

U.S. PATENT DOCUMENTS

| | | | |
|---|---|---|---|
| 9,737,986 B2 * | 8/2017 | Hardouin | B25J 5/007 |
| 2002/0053893 A1 * | 5/2002 | Khairallah | B25J 9/08 |
| | | | 318/568.1 |
| 2014/0379129 A1 * | 12/2014 | Edsinger | B25J 9/0009 |
| | | | 700/254 |
| 2015/0258435 A1 * | 9/2015 | Zhang | A63F 13/235 |
| | | | 463/36 |
| 2017/0288976 A1 * | 10/2017 | Wang | H04L 41/12 |
| 2017/0320210 A1 * | 11/2017 | Ding | B25J 9/1687 |
| 2018/0117762 A1 * | 5/2018 | Earwood | B25J 9/1605 |

FOREIGN PATENT DOCUMENTS

| | | | | |
|---|---|---|---|---|
| CN | 106272550 A | | 1/2017 | |
| CN | 107045297 A | * | 8/2017 | ............ G05B 19/04 |
| CN | 201020717 Y | | 2/2018 | |
| CN | 108326841 A | | 7/2018 | |
| DE | 202017004815 U1 | * | 12/2017 | .......... B01F 13/0818 |
| EP | 1315087 A1 | | 5/2003 | |
| WO | WO-2017042548 A1 | * | 3/2017 | ............ A63H 11/00 |

\* cited by examiner

MODULAR ROBOT, SYSTEM THEREOF, CONTROL METHOD FOR MODULAR ROBOT

TECHNICAL FIELD

The present invention relates to the field of robot, and more particularly to a modular robot and a system and a control method thereof.

BACKGROUND

Robots have been widely used in life and industry, e.g., used for training students' creative thinking skills in teaching and used for welding, spraying, assembling, carrying and other operations in automated production. Although as an execution system, a robot has great flexibility to complete different work tasks, an existing robot often has only one main function for specific use purposes and occasions due to fixed freedom degree and configuration and lack of functional scalability and re-configurability. In addition, it is very expensive to develop a specific robot for each field and each application, which severely restricts the popularization and application of robots. Therefore, a reconfigurable robot comes into being. The reconfigurable robot is generally obtained by combining a plurality of modules. The existing method for calculating a specific position of each module on the reconfigurable robot has the problems of poor flexibility and difficulty in obtaining position information.

SUMMARY

To overcome the problem of difficulty in obtaining position information of the existing robot, the present invention provides a modular robot and a system and a control method thereof.

A solution of the present invention for solving the technical problems is to provide a modular robot, wherein the modular robot includes at least two unit modules which include at least a subunit module; the subunit module includes at least two connected submodules which can be controlled by electrical signals to rotate relatively, to change the modular robot configuration; and every unit module provides at least a docking part where unit modules are connected, different docking parts of every unit module have interface identification information which can be recognized; and the position information of the unit module is characterized by recognizing interface identification information of docking parts of connected unit modules.

Preferably, the subunit module further includes an angle measuring device and a control chip, the angle measuring device senses relative rotation between two submodules and generates sensing signals, and the control chip controls the rotation between submodules to cease or run according to sensing signals.

Preferably, the two submodules of the subunit module respectively include a first housing and a second housing which are rotatably connected by a multi-stage bearing assembly, and the two submodules can rotate relatively under external force.

Preferably, the unit modules are connected mechanically and electrically through the docking part, the unit module further includes a control chip and has a plurality of docking parts wherein different docking parts are connected to different pins of the control chip, and the unit module sends different electrical signals through the docking part or sends electrical signals to the connected unit module based on a time sequence, so that interface identification information of docking parts can be recognized by connected unit modules thereof.

Preferably, the modular robot further includes a main control module which provides at least a docking part, the main control module and the subunit module are connected through the docking part, from the main control module to the free end of the modular robot, to recognize interface identification information of docking parts of adjacent module units step by step and to obtain the position information of the modular robot.

Preferably, the main control module provides at least a plug interface connected electrically to the main control module, wherein the plug interface is used for pluggable connection with the external unit.

Preferably, the subunit module directly connected to the main control module is defined as a first-level subunit module, the subunit module connected to the first-level subunit module is defined as a second-level subunit module, and the subunit module connected to the $M^{th}$-level subunit module is defined a $(M+1)^{th}$-level subunit module, M being an integer greater than or equal to 1; the process of obtaining the position information of the modular robot is: the main control module sends a first electrical signal to notify the unit module to prepare for the recognition of interface identification information; different docking parts of the main control module send different second electrical signals or send second electrical signals based on a time sequence; the first-level subunit module confirms interface identification information of the connected main control module according to the second electrical signals the first-level subunit module receives; the first-level subunit module obtains interface identification information of the docking part connected to the main control module according to the docking part receiving second electrical signals; the first-level subunit module sends interface identification information of the main control module and the docking part connected to the main control module to the main control module through wired or wireless transmission; different docking parts of the $M^{th}$-level subunit module send different second electrical signals or send second electrical signals based on a time sequence to the connected $(M+1)^{th}$-level subunit module; the $(M+1)^{th}$-level subunit module confirms interface identification information of the connected $M^{th}$-level main control module according to the second electrical signals the $(M+1)^{th}$-level subunit module receives; the $(M+1)^{th}$-level subunit module obtains interface identification information of the docking part connected to the $M^{th}$-level main control module according to the docking part receiving second electrical signals; the $(M+1)^{th}$-level subunit module sends interface identification information of the $M^{th}$-level main control module and the docking part connected to the $M^{th}$-level main control module to the main control module through wired or wireless transmission.

Preferably, the modular robot further includes a wheel, the wheel also includes the docking part, and the subunit module and the wheel are detachably connected to each other through the docking part; when the docking parts are connected, the two docking parts electrically conduct and/or transmit signals.

The present invention further provides a modular robot system which includes the above modular robot, the external unit connected to the modular robot and a control system, the control system includes a configuration information database, which is configured to store configuration information to the modular robot; an action information database, which is configured to store at least an action information controlling the movement of the modular robot; an external unit setting module, which is configured to set the performance action of the external unit and/or setting the control condition corresponding to the external unit, and to control the modular robot to move and/or the external unit to perform actions according to the setting of the action information and the external unit setting module.

Preferably, the modular robot control system further includes: a logic setting module, which is configured to set the logical relation between the action information and the performance action and/or the control condition; an operation module, which is configured to compile the setting content of the logic setting module to generate an executable program which is used for controlling the work of the modular robot.

The present invention further provides a modular robot control method which includes the following steps: T1: assembling a plurality of unit modules into a constructed entity which is the modular robot as claimed in the claim 1; T2: controlling the two submodules of one or more subunit modules to rotate relatively to generate one or more motion frames; T3: generating preset action control information according to one or more motion frames; and T4: transmitting the preset action control information to the modular robot, such that the modular robot performs an action according to the preset action control information.

Compared with the prior art, the modular robot of the present invention can completely realize the full automation of obtaining the position information, by setting interface identification information for the docking part, and then obtaining the position information of the unit module by recognizing interface identification information.

The modular robot control system provides an action information database which is convenient for users to perform functional modification or expansion. Users can also compile and generate a program to control the rotation of the subunit module in the control system, especially the programming adopts the graphical programming interface which is convenient for users to operate and avoids the trouble of requiring developers to participate in the program modification. The opening of compilation rights will greatly improve the applicability of a single modular robot and bring users newer experience. The action information database can store official or user-defined action information, and facilitate the information reuse or information sharing, which greatly reduces the complexity and repeatability of program development. The control method corresponding to the modular robot control system also has the above advantages.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are only used to explain the present disclosure and are not used to limit the present disclosure.

Figure 1:
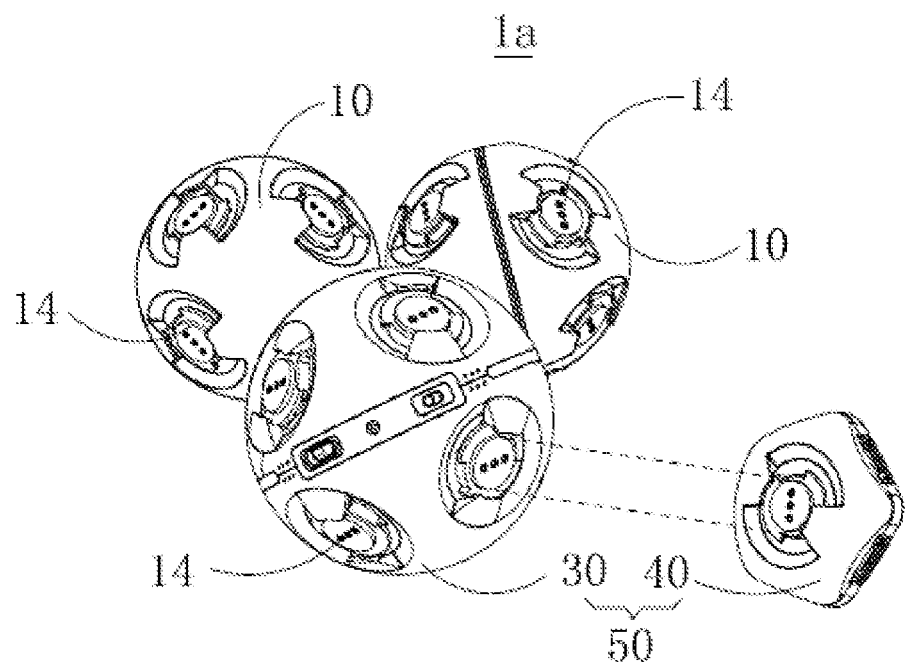
FIG. 1 is a schematic diagram of a three-dimensional structure of a modular robot according to a first embodiment of the present invention.

Referring to FIG. 1, a first embodiment of the present invention provides a programmable modular robot 1a which is composed of a plurality of unit modules connected. Specifically, the modular robot 1a includes a main control module 50 and a cell configuration (unlabeled) connected to the main control module 50, and the cell configuration includes a plurality of subunit modules 10; in FIG. 1, two subunit modules 10 forming a cell configuration is used as an example to illustrate, and actually the number of the subunit module 10 is not limited. Preferably, the main control module 50 provides at least a docking part 14, every subunit module 10 provides at least a docking part 14, preferably provides at least two docking parts 14, and the main control module 50 and the subunit module 10 are connected through the docking part 14. Different connection modes between the main control module 50 and the subunit module 10, and subunit modules 10 as well, can reconstruct modular robots 1a of different configurations.

Figure 2:
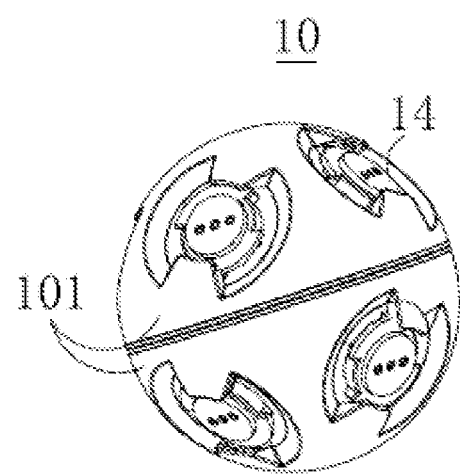
FIG. 2 is a schematic diagram of a three-dimensional structure of a subunit module of the modular robot according to a first embodiment of the present invention.

Referring to FIG. 2, the subunit module 10 includes two relatively rotatable submodules 101 wherein the rotation is controlled by the electrical signals, preferably can be controlled manually. Preferably, the submodule 101 is hemispherical and every submodule 101 provides at least a docking part 14, and a plurality of subunit modules 10 are connected through the docking part 14. Preferably, the number of the docking part 14 provided by every subunit module 10 is 2 or 3, 4, 5, 6, 7 or 8, preferably, different docking parts 14 of every subunit module 10 provide interface identification information so as to confirm the relative connection position of subunit modules 10 (i.e., position information). In FIG. 2, when the subunit module 10 provides eight docking parts 14, interface identification information of these eight docking parts 14 is respectively 001, 002 . . . 008.

Different subunit modules 10 can be connected mechanically and wired electrically through the docking part 14. It may be understood that the docking part 14 of the present invention can realize the mechanical connection between two unit modules, and the wired electrical connection between two unit modules as well. The side the docking part 14 located intersects with the side two submodules rotate, to provide an effective change dimension for the reconfiguration of the modular robot 1a. Preferably, the docking parts 14 on different unit modules of the present invention are all the same.

The main control module 50 writes an erasable program to control the operation of the modular robot 1a. Preferably, the relative rotation between two submodules 101 of a plurality of subunit modules 10 is controlled according to the program to realize the modular robot 1a completing the preset movement. Preferably, the program comes from an electronic device side which makes relevant settings for the modular robot 1a, then compiles and generates an executable program to send to the main control module 50.

As an embodiment, the main control module 50 and the subunit module 10 both provide a plurality of the docking parts 14, the main control module 50 provides a power supply and a first control chip, and different docking parts on the main control module 50 are connected to different pins of the first control chip to recognize interface identification information; the subunit module 10 provides a second control chip, and different docking parts 14 on the subunit module 10 are connected to different pins of the second control chip to recognize interface identification information; the power supply supplies power to the subunit module 10 through the docking part 14, and the first control chip and the second control chip realize wireless communication through ZigBee.

Referring to FIG. 1 again, the main control module 50 includes a main unit module 30 and a control body 40, the main unit module 30 is connected to the cell configuration, and the control body 40 is connected to the main unit module 30; as a deformation, the control body 40 and the main unit module 30 are not mechanically connected but keep wireless electrical connection. The control body 40 writes an erasable program and controls the work of the modular robot 1a by the main unit module 30 according to the program.

Referring to FIG. 1 again, preferably, the main unit module 30 provides at least a docking part 14, preferably provides at least two docking parts 14, and the number of the docking part 14 provided by the main unit module 30 is 2 or 3, 4, 5, 6, 7 or 8; preferably, different docking parts 14 of every subunit module 10 provide interface identification information. In FIG. 1, when the main unit module 30 provides eight docking parts 14, interface identification information of these eight docking parts 14 is respectively 001, 002 . . . 008. The main unit module 30 is connected to the subunit module 10 through the docking part 14. Preferably, the main unit module 30 has a function of power supply which can supply power to the control body 40 and the subunit module 10. Preferably, the main unit module 30 and the subunit module 10 are wired electrically connected through the docking part 14, and wireless electrically connected through wireless communication system, such as wireless communication using zigbee technology, Bluetooth, NFC and other technologies. Preferably, wireless communication is performed through zigbee system, correspondingly, the main unit module 30 provides a zigbee main module, the subunit module 10 provides a zigbee submodule 101. Preferably, the subunit module 10 communicates with the electronic device side through the main unit module 30, and the subunit module 10 does not directly communicates with the electronic device side, which can reduce the hardware requirements of the cell configuration.

Figure 3A:
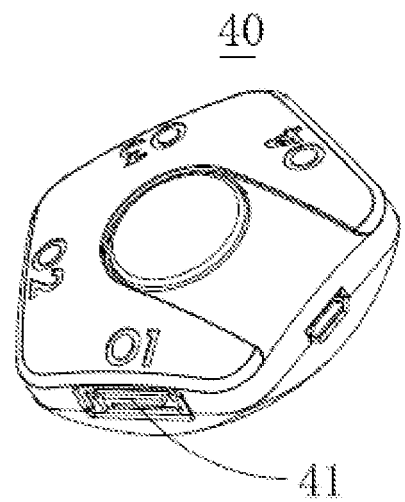
FIGS. 3A and 3B are schematic diagrams of a three-dimensional structure of a control body from different angles according to a first embodiment of the present invention.
Figure 3B:
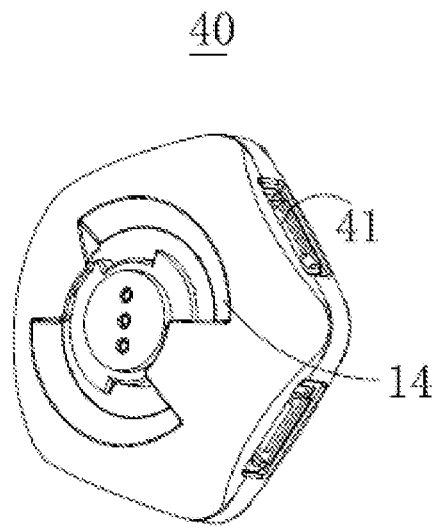

Referring to FIGS. 3A and 3B, the control body 40 includes at least a docking part 14, and the control body 40 is connected to the main unit module 30 through the docking part 14. The control body 40 provides at least a Bluetooth module (not shown), specifically provides a first Bluetooth module which is used for communication with the electronic device side and receipt of the program from the electronic device side, preferably, the control body 40 provides a second Bluetooth module, and the control body 40 wirelessly communicates with the main unit module 30 through the second Bluetooth module. As a deformation, the second Bluetooth module can be omitted, and the control body 40 and the main unit module 30 are directly and wired electrically connected. The control body 40 provides at least a plug interface 41, and an external unit (not shown) is plugged into the plug interface 41. The external unit returns work information to the control body 30 while working, the program can be set to control the relative rotation between two submodules 101 of the subunit module 10 according to work information returned by the external unit, or to control the work of the external unit according to work information of the subunit module 10. Preferably, the external unit returns work information in real time, and the control body 40 controls the rotation of the subunit module 10 according to work information returned by the external unit in real time. Specifically, the external unit may be a sensor and/or an actuator. The sensor can be an ultrasonic sensor, an infrared sensor, a temperature sensor, a brightness sensor, a color sensor and so on. The actuator can be a sucker, an electromagnet, a mechanical gripper and so on. The program can be set to control the relative rotation between two submodules 101 of the subunit module 10 according to work information returned by the sensor and/or the actuator. For example, an ultrasonic sensor is connected to the plug interface 41 of the modular robot 1a, when the ultrasonic sensor detects an obstacle, the ultrasonic sensor detects the distance to the obstacle and returns work information (distance parameter), and the program sets that when the distance is less than a certain value, the control body 40 controls the subunit module 10 to stop rotating through the main unit module 30, and the modular robot 1a stops moving to avoid contact with the obstacle. For another example, a pneumatic sucker is connected to the plug interface 41 of the modular robot 1a, the pneumatic sucker is configured to adsorb articles, and the modular robot 1a works to transport articles from one place to another place for a distance. The pneumatic sucker returns work information (execution status) to the control body 40 and informs the control body 40 whether the article is adsorbed, when the control body 40 receives the working parameter representing the adsorption of the article, the control body 40 controls the movement of the subunit module 10 through the main unit module 30 to make the modular robot 1a move along a preset path to deliver the article to the destination.

As a deformation, the main unit module 30 and the control body 40 are not designed separately, the two are integrated on a module, and the main control module 50 provides both a docking part 14 and a plug interface 41. Herein, the integration level of the modular robot al can be improved.

As a deformation, the subunit modules 10 respectively have a power storage function and a direct communication function with the electronic device side and/or the main control module 50. Therefore, the main control module 50 can be mechanically connected to the cell configuration, or alternatively not setting mechanical connection. In this case, the main control module 50 is the control body 40.

Figure 4:
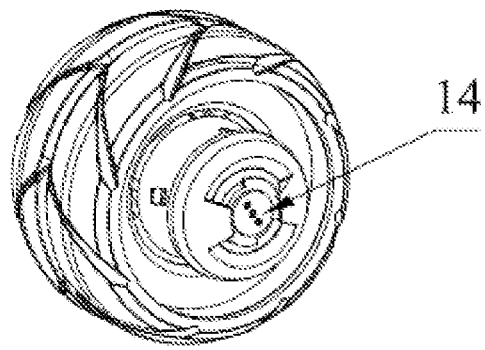
FIG. 4 is a structural diagram of a wheel.

It may be understood that the configuration of the modular robot al is not limited, as an alternative, the unit module (the main unit module 30, the subunit module 10 and the control body 40, the main control module 50) can have arbitrary configurations, and the docking part 14 can have only a mechanical connection function. The unit modules can also communicate only through wired electrical connection or wireless electrical connection. The configurations of all subunit modules 10 can be completely the same or at least partially different. The unit module can also be a wheel with a docking part 14 as shown in FIG. 4 and other modules.

Figure 5A:
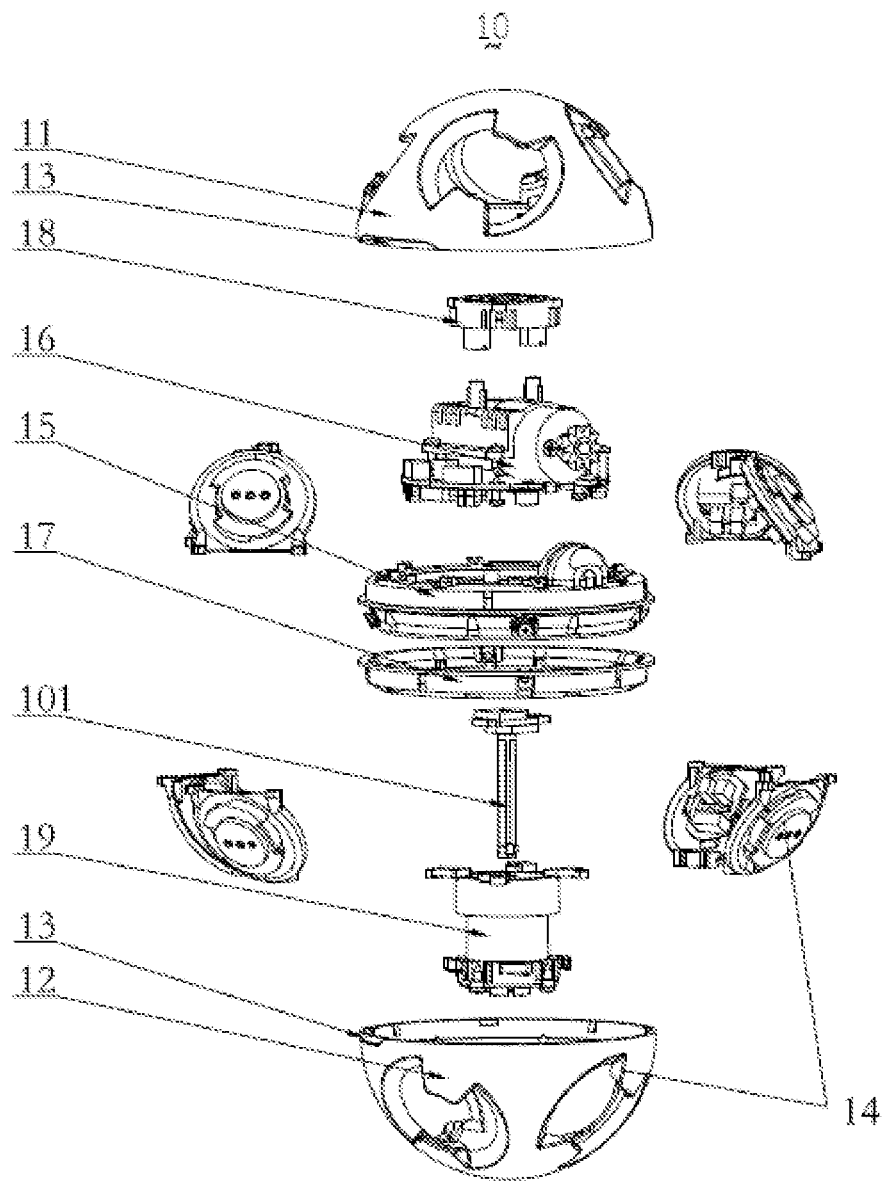
FIG. 5A is an exploded structural diagram of a subunit module of the modular robot according to a first embodiment of the present invention.

Referring to FIG. 5A, an embodiment of the present invention provides the specific structure of the subunit module 10, the shape of the subunit module 10 is spherical, the subunit module 10 includes a first housing 11 and a second housing 12 which are located oppositely and rotatably connected, the subunit module 10 also includes a prompting member 13, a multi-stage bearing assembly 15, a driving assembly 16, a connecting ring 17, a mounting frame 18, a rotating conductive assembly 19 and an angle measuring device 101. The first housing 11 and the second housing 12 are rotatably connected to define an accommodating space, and the multi-stage bearing assembly 15, the driving assembly 16, the connecting ring 17, the mounting frame 18, the rotating conductive assembly 19 and the angle measuring device 101 are all set in the accommodating space. The first housing 11 and the second housing 12 respectively provide a docking part 14. The multi-stage bearing assembly 15 is set in the accommodating space and is located at the joint where the first housing 11 and the second housing 12 are rotatably connected, the driving assembly 16 and the multi-stage bearing assembly 15 are connected, the first housing 11 and the multi-stage bearing assembly 15 are connected; the mounting frame 18 is connected to the multi-stage bearing assembly 15 and is located at a side of the multi-stage bearing assembly 15 away from the second housing 12, the mounting frame 18 and the first housing 11 are connected; the connecting ring 17 and the multi-stage bearing assembly 15 are connected, the second housing 12 and the connecting ring 17 are connected, the angle measuring device 101 and the rotating conductive assembly 19 are both connected to the multi-stage bearing assembly 15 and are located at a side of the multi-stage bearing assembly 15 away from the first housing 11, the angle measuring device 101 and the rotating conductive assembly 19 are both electrically connected to the driving assembly 16, the angle measuring device 101 passes through the rotating conductive assembly 19, the angle measuring device 101 and the rotating conductive assembly 19 are connected at a side away from the first housing 11, the rotating conductive assembly 19 and the second housing 12 are connected. The prompting member 13 is located at an edge of the first housing 11 in contact with the second housing 12; and/or the prompting member 13 is located at an edge of the first housing 12 in contact with the second housing 11. It may be understood that the prompting member 13 can also be located at other parts of the first housing and/or the second housing. It may be understood that when there are a plurality of the subunit modules 10, the first housing 11 and the second housing 12 of the subunit module 10 can relatively rotate one by one, or the first housing 11 and the second housing 12 of the subunit module 10 relatively rotate simultaneously. It may be understood that the subunit module 10 can include a power supply which is located in the accommodating space, the power supply and the main circuit board 161 are electrically connected.

Figure 5B:
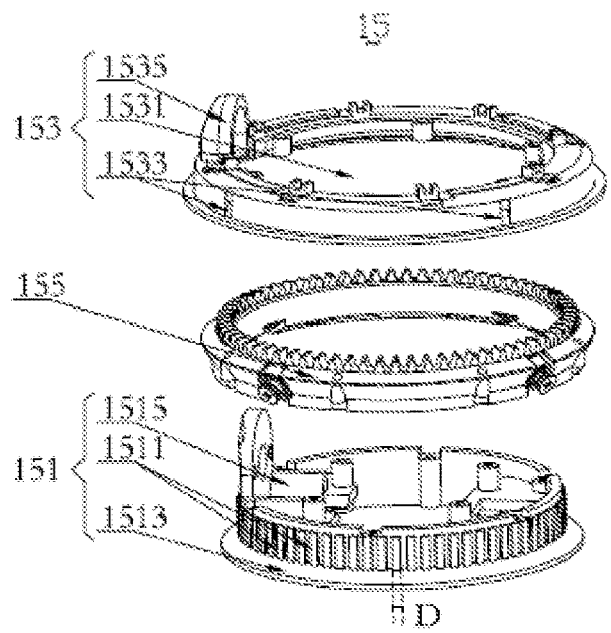
FIG. 5B is an exploded structural diagram of a multi-stage bearing assembly of the modular robot according to a first embodiment of the present invention.
Figure 5C:
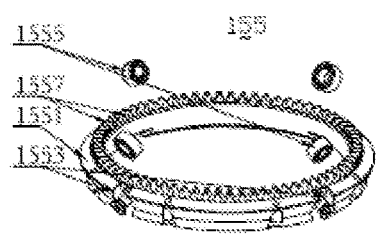
FIG. 5C is an exploded structural diagram of a middle ring assembly of the modular robot according to a first embodiment of the present invention.
Figure 5D:
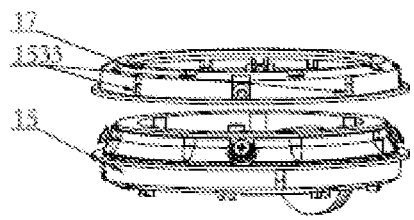
FIG. 5D is an exploded structural diagram of a multi-stage bearing assembly and a connecting ring of the modular robot according to a first embodiment of the present invention.

Referring to FIGS. 5B, 5C and 5D, the multi-stage bearing assembly 15 includes a multi-stage bearing assembly inner ring 151, a multi-stage bearing assembly outer ring 153 and a middle ring assembly 155, the middle ring assembly 155 is located at the multi-stage bearing assembly inner ring 151, the middle ring assembly 155 is placed in between the multi-stage bearing assembly inner ring 151 and the multi-stage bearing assembly outer ring 153, the middle ring assembly 155 can rotate relative to the multi-stage bearing assembly outer ring 153 and the multi-stage bearing assembly inner ring 151. Preferably, the multi-stage bearing assembly inner ring 151 and the multi-stage bearing assembly outer ring 153 are connected, the middle ring assembly 155 can rotate relative to the multi-stage bearing assembly outer ring 153 and the multi-stage bearing assembly inner ring 151. Therein, the multi-stage bearing assembly inner ring 151 is connected to the driving assembly 16, the rotating conductive assembly 19 and the angle measuring device 101, and the multi-stage bearing assembly inner ring 151 is connected to the multi-stage bearing assembly outer ring 153 by successively passing through the mounting frame 18 and the docking part 14, the multi-stage bearing assembly outer ring 153 is also connected to the first housing 11; the driving assembly 16 is engaged with the middle ring assembly 155 to drive the middle ring assembly 155 to rotate; the middle ring assembly 155 is connected to the connecting ring 17, the connecting ring 17 is connected to the second housing 12, the connecting ring 17 is connected to a side of the rotating conductive assembly 19 away from the first housing 11 through the docking part 14 (the docking part 14 is located in the housing). It may be understood that the subunit module 10 can also receive external force, the external force makes the first housing 11 and the second housing 12 relatively rotate, here the second housing 12 drives the middle ring assembly 155 to rotate relative to the multi-stage bearing assembly inner ring 151 and the multi-stage bearing assembly outer ring 153. The material of the multi-stage bearing assembly 15 is preferably polyformaldehyde ("POM" for short) which has high thermal strength, bending strength, fatigue resistance, wear resistance, and self-lubricating properties.

The multi-stage bearing assembly inner ring 151 is substantially circular, the outer side of the multi-stage bearing assembly inner ring 151 is provided with a convex rib 1511, an end of the multi-stage bearing assembly inner ring 151 away from the first housing 11 is provided with a convex edge 1513 away from the center of the multi-stage bearing assembly inner ring 151, an end of the multi-stage bearing assembly inner ring 151 close to the first housing 11 is provided with a motor mounting part 1515. The width D of the convex rib 1511 is 1 to 3 mm, preferably 1.5 to 2.5 mm, and all the convex ribs 1511 are evenly distributed on a circumference. A gap between the convex ribs 1511 is 0.2 to 1.5 mm, preferably 0.3 to 1 mm. The convex ribs 1511 make the friction force between the middle ring assembly 155 and the multi-stage bearing assembly inner ring 151 smaller. Preferably, the convex edge 1513 is inclined away from the first housing 11 to make the convex edge 1513 and the middle ring assembly 155 better contact, and the convex edge 1513 blocks the middle ring assembly 155 from moving in an axial direction of the multi-stage bearing assembly inner ring 151. It may be understood that the multi-stage bearing assembly inner ring 151 may also be provided with a corresponding partition plate or connecting plate, etc., so as to connect other parts of the subunit module 10, such as connection to the multi-stage bearing assembly outer ring 153. Preferably, the material of the multi-stage bearing assembly inner ring 151 is polyformaldehyde, which can prolong the service life of the multi-stage bearing assembly inner ring 151, and make the middle ring assembly 155 and the multi-stage bearing assembly inner ring 151 rotate more smoothly, so that the friction between the middle ring assembly 155 and the multi-stage bearing assembly inner ring 151 is small.

The middle ring assembly 155 includes a rotating ring 1551 and a plurality of bearings 1555. The bearings 1555 are in rolling contact with the convex edge 1513 of the multi-stage bearing assembly inner ring 151 and the multi-stage bearing assembly outer ring 153. The rotating ring 1551 connects the plurality of bearings 1555 together. The bearings 1555 are rotatable relative to the rotating ring 1551. Meanwhile, the rotating ring 1551 sleeves the multi-stage bearing assembly inner ring 151. It may be understood that an outer ring of the bearing 1555 is in rolling contact with at least one of the convex edges 1513 of the multi-stage bearing assembly inner ring 151 and the multi-stage bearing assembly outer ring 153.

The rotating ring 1551 is preferably circular. A plurality of grooves 1553 is formed on a side of the rotating ring 1551, the number of the grooves 1553 corresponds to the number of the bearings 1555, and the bearings 1555 are installed in the grooves 1553. The grooves 1553 penetrate two end surfaces of the rotating ring 1551, so that the bearings 1555 can contact the convex edge 1513 of the multi-stage bearing assembly inner ring 151 and the multi-stage bearing assembly outer ring 153. Preferably, the side of the rotating ring 1551 is inclined, and thus the bearings 1555 mounted on the side of the rotating ring 1551 are also inclined, so that the outer ring of the bearing 1555 is better in contact with the convex edge 1513 of the multi-stage bearing assembly inner ring 151, and also the connecting ring 17 is better connected to the rotating ring 1551 of the middle ring assembly 155. An end of the rotating ring 1551 away from the second housing 12 and close to the center of the rotating ring 1551 is provided with a circular rotating gear 1557, the rotating gear 1557 is engaged with the drive assembly 16. Preferably, the material of the rotating ring 1551 is polyformaldehyde.

The type of the bearing 1555 is not limited. Preferably, the bearings 1555 are evenly distributed on the side of the rotating ring 1551. The diameter of the bearing 1555 outer ring is 3 to 12 mm, preferably 4 to 8 mm.

The multi-stage bearing assembly outer ring 153 is substantially circular, the multi-stage bearing assembly outer ring 153 provides an annular accommodating groove 1531 in an axial direction, to provide a position for the installation of other parts, such as the connection between the mounting frame 18 and the multi-stage bearing assembly outer ring 153. The multi-stage bearing assembly outer ring 153 also provides a motor protection part 1535 in an axial direction. When the multi-stage bearing assembly outer ring 153 is connected to the multi-stage bearing assembly inner ring 151, the position of the motor protection part 1535 and the position of the motor mounting part 1515 match with each other. At least two bayonets 1533 are also formed on a side wall of the multi-stage bearing assembly outer ring 153, the bayonet 1533 is used for snap-fitting connection to the first housing 11. Preferably, the bayonets 1533 are evenly distributed on the side of the multi-stage bearing assembly outer ring 153. Preferably, the material of the multi-stage bearing assembly outer ring 153 is polyformaldehyde.

The connecting ring 17 is configured on a side of the multi-stage bearing assembly 15 away from the first housing 11, the connecting ring 17 is connected to the middle ring assembly 155. The connecting ring 17 is substantially circular, and a plurality of bayonets is formed on a side wall of the connecting ring 17, the bayonets on the connecting ring 17 are the same as the bayonets 1533 on the multi-stage bearing assembly outer ring 153. Preferably, the bayonets on the connecting ring 17 are evenly distributed on a side wall of the connecting ring 17. It may be understood that the connecting ring 17 may be omitted, when the connecting ring 17 is omitted, the second housing 12 is directly connected to the rotating ring 1551 of the middle ring assembly 155.

Figure 5E:
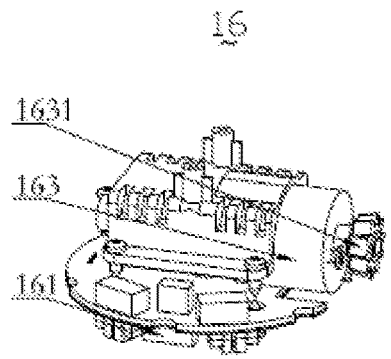
FIG. 5E is a schematic diagram of a three-dimensional structure of a driving assembly of the modular robot according to a first embodiment of the present invention.

Referring to FIG. 5E, the drive assembly 16 includes a main circuit board 161, a motor 163 and a bevel gear 1631. The main circuit board 161 and the motor 163 are both connected to the rotating ring 1551, the motor 163 is located on a side of the main circuit board 161 close to the first housing 11, that is, the motor 163 is configured on the motor mounting part 1515 of the rotating ring 1551, and the motor protection part 1535 of the multi-stage bearing assembly outer ring 153 partially protects a rotating shaft of the motor 163. The motor 163 is also electrically connected to the main circuit board 161, the bevel gear 1631 is connected to the rotating shaft of the motor 163, the bevel gear 1631 is engaged with the rotating gear 1557 on the rotating ring 1551 of the middle ring assembly 155. When the motor 163 rotates, the bevel gear 1631 is driven to rotate, the bevel gear 1631 drives the rotating ring 1551 to rotate, and the bearings 1555 on the rotating ring 1551 are in rolling contact with the convex edge 1513 of the multi-stage bearing assembly inner ring 151, the bearings 1555 on the rotating ring 1551 are in rolling contact with the multi-stage bearing assembly outer ring 153, and the rotating ring 1551 drives the connecting ring 17 connected to the rotating ring 1551 and the second housing 12 to rotate. It may be understood that when a user makes the first housing 11 and the second housing 12 rotate relatively with an external force, the middle ring assembly 155 drives the rotating shaft of the motor 163 to rotate.

Components necessary for the functionality of the subunit module 10 are integrated on the main circuit board 161, the main circuit board 161 includes a signal receiving module configured to receive signals from other subunit modules 10 or the main communication module of the main unit module 30, and the main circuit board 161 also includes a control circuit, such as a central processing unit, configured to control the operation of other modules or components. The control circuit of the main circuit board 161 can receive control signals from other robot modules to control the relative rotation of the first housing 11 and the second housing 12 of the subunit module 10. The control circuit receives control signals through the docking part 14 or the control circuit receives wireless control signals, to control the motor 163 to drive the multi-stage bearing assembly 15 to rotate. It may be understood that when other components are electrically connected to the main circuit board 161, the main circuit board 161 will be electrically connected to the control circuit.

Figure 5F:
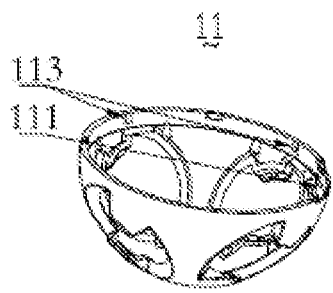
FIG. 5F is a schematic diagram of a three-dimensional structure of a first housing of the modular robot according to a first embodiment of the present invention.

Referring to FIG. 5F, the mounting frame 18 is configured on a side of the motor 163 away from the second housing 12, the mounting frame 18 is connected to the multi-stage bearing assembly inner ring 151. The material of the mounting frame 18 is preferably plastic.

The first housing 11 is substantially hemispherical, a cuneate boss 113 is provided at a position where the first housing 11 and the multi-stage bearing assembly outer ring 153 are connected, the number and position of the cuneate boss 113 correspond to the number and position of the bayonet 1533 of the multi-stage bearing assembly outer ring 153. When the first housing 11 is connected to the multi-stage bearing assembly outer ring 153, the cuneate boss 113 is snap-fitted into the bayonet 1533, so that the first housing 11 and the bayonet 1533 are snap-fitted connected. After the snap-fitted connection, the cuneate boss 113 and the bayonet 1533 are both inside the subunit module 10, and thus the subunit module 10 can be prevented from being easily disassembled, thereby achieving certain confidentiality and protection for the internal structure of the subunit module 10. It may be understood that the position of the cuneate boss 113 and the position of the bayonet 1533 can be exchanged without affecting the snap-fitting function. The contact surface where the first housing 11 is in contact with the second housing 12 is provided with a yield area 111, the yield area 111 is configured to install the prompting member 13 so that the prompting member 13 does not interfere with other components. It may be understood that the prompting member 13 may also be provided at other positions on the first housing 11, preferably provided close to the docking part 14. The prompting member 13 may also be provided at the docking part 14 of the first housing 11. When the subunit module 10 needs to be connected to other subunit modules 10 or the main unit module 30 or the wheel through the docking part 14, the prompting member close to the docking part 14 or the prompting member 13 on the docking part 14 illuminates. The prompting member 13 is preferably a light strip, and may also be one or more indicator lamps, such as an LED lamp, so that the prompting member 13 may illuminate.

The structure of the second housing 12 is the same as that of the first housing 11, for example, a cuneate boss 113 is configured at a position where the first housing 11 is connected to the connecting ring 17, and the contact surface where the second housing 12 is in contact with the first housing 11 is provided with a yield area 111 for installing the prompting member 13, which will not be further elaborated in the present invention. It may be understood that the prompting member 13 may also be configured at other positions on the second housing 12, preferably configured close to the docking part 14. The prompting member 13 may also be provided on the docking part 14 of the second housing 12. When the subunit module 10 needs to be connected to other subunit modules 10 or the main unit module 30 or the wheel through the docking part 14, the prompting member close to the docking part 14 or the prompting member 13 on the docking part 14 illuminates.

Figure 6A:
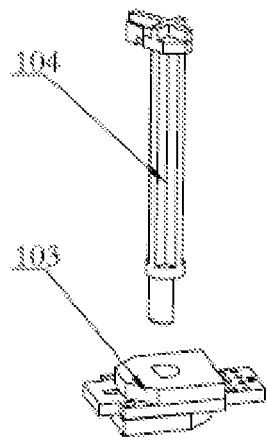
FIG. 6A is an exploded structural diagram of an angle measuring device of the modular robot according to a first embodiment of the present invention.
Figure 6B:
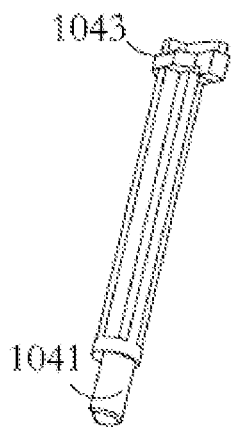
FIG. 6B is a schematic diagram of a three-dimensional structure of a rotating shaft of the modular robot according to a first embodiment of the present invention.
Figure 6C:
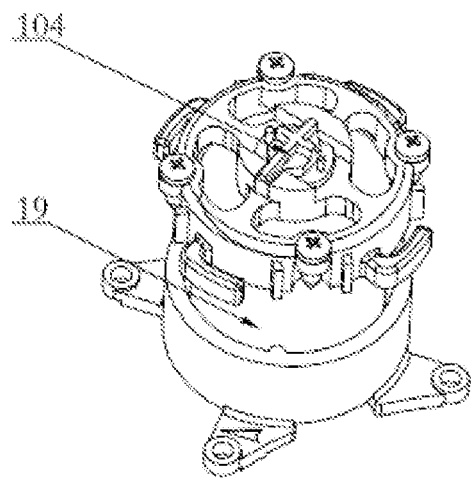
FIG. 6C is a schematic diagram of a three-dimensional structure of a cooperative connection between a rotating shaft and a rotating conductive assembly of the modular robot according to a first embodiment of the present invention.

Referring to FIG. 6A-6C, the angle measuring device 101 directly senses the rotation of the second housing 12 relative to the first housing 11. Specifically, the angle measuring device 101 includes a rotating shaft 104 and a sensor 103, the sensor 103 is connected to the first housing 11 through the multi-stage bearing assembly inner ring 151, the rotating shaft 104 includes a first end 1041 and a second end 1043 opposite to each other, and the first end 1041 of the rotating shaft 104 is connected to the sensor 103, the second end 1043 of the rotating shaft 104 is connected to the second housing 12. When the second housing 12 rotates relative to the first housing 11, the rotating shaft 104 is driven to rotate, and the rotation of the second housing 12 is sensed by the sensor 103. It may be understood that the angle measuring device 101 may also indirectly sense the rotation of the second housing 12 relative to the first housing 11, specifically, the angle measuring device 101 is an encoder or a code disc, which is configured at the rotating shaft of the motor 163 to sense the rotation of the motor 163, so that a relative rotation angle between the first housing 11 and the second housing 12 can be calculated. It may be understood that the angle measuring device 101 is not limited to the above-mentioned structure, as long as the angle measuring device 101 can sense the rotation angle of the second housing 12 relative to the first housing 11.

The across-sectional shape of the first end 1041 of the rotating shaft 104 is preferably substantially "D-shaped", when the rotating shaft 104 and the sensor 103 are connected, inserting the sensor 103 can play a foolproof role, and when the rotating shaft 104 is removed, the rotating shaft 104 needs to be installed from the same angle again. The second end 1043 of the rotating shaft 104 is preferably of a pointer shape, when the rotating shaft 104 and the second housing 12 are connected, the rotating shaft 104 also plays a foolproof role, and when the rotating shaft 104 is removed, the rotating shaft 104 needs to be installed from the same angle again. Therefore, the second housing 12 and the sensor 103 are always kept at a same angle, after the subunit module 10 is disassembled, there is no need to readjust for reassembling. It may be understood that the shapes of the first end 1041 and the second end 1043 of the rotating shaft 104 are not completely limited to the shapes in this embodiment, and other foolproof structures may be formed as long as a foolproof effect can be realized. The other parts of the subunit module 10 need a foolproof effect, and their shapes are not limited, as long as a foolproof structure can be formed. The foolproof structure is a modification that is easily conceived by those skilled in the art, and will not be further illustrated in the present invention by examples.

When the angle measurement device 101 is in use, the angle measurement device 101 directly or indirectly senses the rotation of the second housing 12 relative to the first housing 11, the angle measurement device 101 generates a sensing signal and transmits the same to the control circuit of the main circuit board 161, and the control circuit controls the relative rotation of the first housing and the second housing according to the sensing signal, including the progress of the rotation, the stop of the rotation, the rotation speed during the rotation, etc.

During control, the angle measurement device 101 sends a control signal to the control circuit, and the control circuit determines a relative angle that the second housing 12 and the first housing 11 need to rotate according to the control signal; the control circuit controls the relative rotation of the first housing 11 and the second housing 12, the control circuit receives the sensing signal, and after the control circuit confirms that the relative rotation angle of the first housing 11 and the second housing 12 is in place according to the sensing signal, the control circuit controls the second housing 12 to stop rotating relative to the first housing 11.

As another control method, after the first housing 11 and the second housing 12 are rotated by an external force, the angle measuring device 101 senses a rotation angle and sends a sensing signal to the control circuit, and the control circuit determines the relative rotation angle of the first housing 11 and the second housing 12 according to the sensing signal and transmits the sensing signal to a control terminal; the control terminal can determine the spatial position of each subunit module according to the relative rotation angle of the first housing 11 and the second housing 12 of each subunit module 10. The control terminal sends a preset action signal to the control circuit according to the preset action, and the control circuit determines a relative angle that the second housing 12 and the first housing 11 need to rotate according to the preset action signal, the control circuit controls the first housing 11 and the second housing 12 to rotate relatively, and the control circuit receives the sensing signal, after the control circuit determines that the relative rotation angle of the first housing 11 and the second housing 12 is in place according to the sensing signal, the control circuit controls the second housing 12 to stop rotating relative to the first housing 11.

Figure 6D:
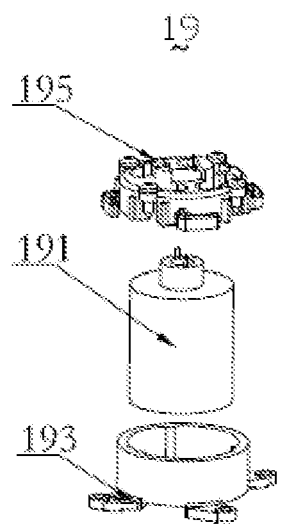
FIG. 6D is an exploded structural diagram of a rotating conductive assembly of the modular robot according to a first embodiment of the present invention.

Referring to FIG. 6D, the rotating conductive assembly 19 includes a fixed end and a rotating end that are configured oppositely, the rotating end is rotatable relative to the fixed end, and the fixed end is connected to the first housing 11 through the multi-stage bearing assembly inner ring 151, the rotating end is connected to the second housing 12, therein, the second end 1043 of the rotating shaft 104 passes through the rotating conductive assembly 19 and is connected to the rotating end. Specifically, the rotating conductive assembly 19 includes a conductive ring 191, a conductive ring holder 193 and a connecting frame 195, the conductive ring holder 193 sleeves the conductive ring 191 and fixes the conductive ring 191 on the first housing 11; an end of the conductive ring 191 away from the first housing 11 is connected to the second housing 12 through the connecting frame 195, and the conductive ring 191 is provided with a hollow hole 1911 penetrating through two ends thereof in an axial direction to allow the second end 1043 of the rotating shaft 104 to pass through. The conductive ring holder 193 is located at the fixed end, and the connecting frame 195 is located at the rotating end.

Referring to FIG. 5A again, the structure of the docking part 14 configured on the second housing 12 is the same as the structure of the docking part 14 described above, and the docking part 14 on the second housing 12 is connected to the first housing 11, the rotating ring 1551 of the middle ring assemble 155 respectively through the connecting ring 17. The docking part is electrically connected to the main circuit board 161 through the conductive ring 191. When the second housing 12 rotates by using the rotating conductive assembly 19, the wires for the electrical connection to the docking part 14 will not be twisted due to the rotation, and will not be broken due to too many turns.

Figure 6E:
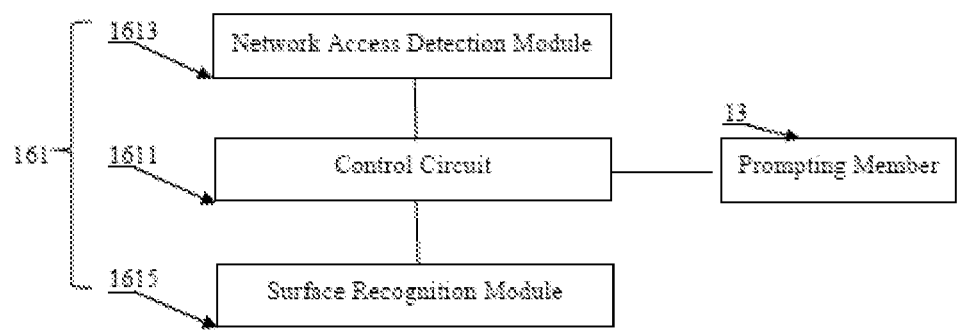
FIG. 6E is a schematic diagram of a circuit module structure of a prompting member of the modular robot according to a first embodiment of the present invention.

Referring to FIG. 6E, this embodiment will continue to describe the prompting member 13 on the basis of the above-mentioned prompting member 13. The prompting member 13 and the main circuit board 161 are electrically connected. The main circuit board 161 controls the prompting member 13 to send out prompts in different situations. For example, when the prompting member 13 is an indicator light, the main circuit board 161 controls the light of the prompting member 13 in different situations.

The main circuit board 161 includes a control circuit 1611, a network access detection module 1613 and a surface recognition module 1615. The prompting member 13, the network access detection module 1613 and the surface recognition module 1615 are all electrically connected to the control circuit 1611. The prompting member 13 has a plurality of luminous modes. The control circuit 1611 may control the prompting member 13 to illuminate in the following three modes. In a first mode, when the control circuit 1611 is electrically connected to the outside, for example, when the subunit module 10 is connected to other subunit modules 10, the main unit module 30 or the wheel through the docking part electrically connected to the main circuit board 161, the subunit module 10 is electrically conducted, or the subunit module 10 receives a signal transmitted by other unit modules, the control circuit 1611 controls the prompting member 13 to issue a prompt. In a second mode, the control circuit 1611 detects that the subunit module 10 is networked according to the network access detection module 1613, and the control circuit 1611 controls the prompting member 13 to issue a prompt. In a third mode, the control circuit 1611 detects that other subunit modules 10, the main unit module 30 or the wheel are under surface recognition according to the surface recognition module 1615, and the control circuit 1611 controls the prompting member 13 to issue a prompt. When issuing a prompt, the prompting member 13 can emit light with different colors, or keep constantly illuminating for different times, such as 0.5 to 6 seconds, or flash at different frequencies, etc. It may be understood that there may be a plurality of prompting members 13, and a plurality of prompting members illuminates in cooperation, for example, a plurality of prompting members flashes in cooperation. It may be understood that the prompting members 13 may also have other control modes.

The modular robots 1*a* of different configurations have configuration parameters representing their configuration characteristics, and the configuration parameters include the position information between the subunit modules 10; preferably, the position information between the subunit modules 10 is obtained by the surface recognition between the subunit modules 10. The subunit module 10 directly connected to the main unit module 30 is defined as a first-level subunit module 10, the subunit module 10 connected to the first-level subunit module 10 is defined as a second-level subunit module 10, and the subunit module 10 connected to the $M^{th}$-level subunit module 10 is defined a $(M+1)^{th}$-level subunit module 10, M being an integer greater than or equal to 1, referring to FIG. 7, the specific surface recognition process includes:

step S11: the main unit module 30 sends a first electrical signal to notify the subunit module 10 to perform surface recognition;

step S12: different docking parts of the main unit module 30 send different second electrical signal or different docking parts of the main unit module 30 send second electrical signals based on a time sequence;

step S13: the first-level subunit module 10 confirms interface identification information of the connected body module according to the second electrical signals; the first-level subunit module 10 obtains interface identification information of the docking part connected to the body module according to the docking part receiving second electrical signals; and step S14: the first-level subunit module 10 sends interface identification information of the connected body module and the docking part connected to the body module to the main unit module 30.

Figure 7:
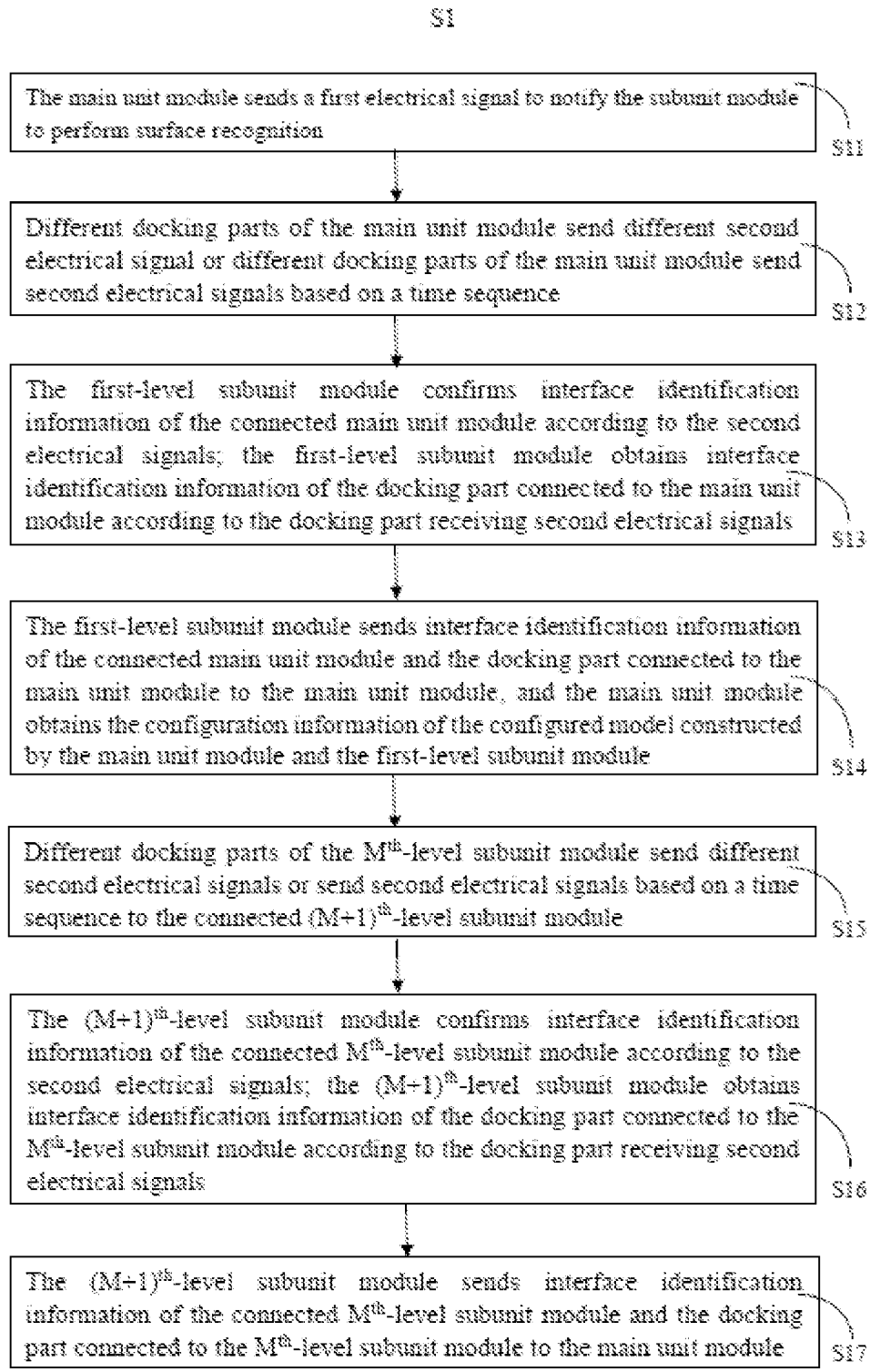
FIG. 7 is a flowchart of detailed steps of a recognition according to the present invention.

Referring to FIG. 7, specifically, the surface recognition process further includes:

step S15: different docking parts of the $M^{th}$-level subunit module 10 send different second electrical signals or send second electrical signals based on a time sequence to the connected $(M+1)^{th}$-level subunit module 10;

step S16: the $(M+1)^{th}$-level subunit module 10 confirms interface identification information of the connected $M^{th}$-level body module according to the second electrical signals; the $(M+1)^{th}$-level subunit module 10 obtains interface identification information of the docking part connected to the $M^{th}$-level body module according to the docking part receiving second electrical signals; and step S17: the $(M+1)^{th}$-level subunit module 10 sends interface identification information of the connected $M^{th}$-level subunit module 10 and the docking part connected to the $M^{th}$-level subunit module 10 to the main unit module 30.

Preferably, different subunit modules 10 of the same level send interface identification information to the main unit module 30 in different time sequences, and different $M^{th}$-level subunit modules 10 send electrical signals to the connected $(M+1)^{th}$-level subunit modules 10 in different time sequences; the surface recognition of the subunit modules 10 is performed level by level, and the surface recognition of the $(M+1)^{th}$-level subunit modules 10 is performed after the surface recognition of the $M^{th}$-level subunit modules 10.

Preferably, after step S14, the main unit module 30 stops sending the second electrical signals, and the main unit module 30 notifies the first-level subunit module 10 by wireless signals to send the second electrical signals to the second-level subunit module 10. After the main unit module 30 receives the information returned from the $(M+1)^{th}$-level subunit module 10, the $M^{th}$-level subunit module 10 stops sending the second electrical signals, and the main unit module 30 notifies the $(M+1)^{th}$-level subunit module 10 by wireless signals to send the second electrical signals to the $(M+2)^{th}$-level subunit module 10.

It may be understood that the signals transmitted from the main unit module to the first-level subunit module can also be wireless signals.

It may be understood that during the surface recognition process, the main unit module 30 is only as a starting point of the surface recognition to be a reference point to define the relative position of the subunit module 10 relative to the main unit module 30. As an option, the mechanical structure and/or circuit structure of the main unit module 30 and the subunit module 10 can be completely consistent.

As a deformation, the first signal of the electronic device can also be wirelessly transmitted. The first signal may be sent through an electronic device. The subunit module 10 directly transmits the relevant interface identification information to the electronic device. That is, every module has a communication function with the electronic device.

Preferably, the first signal is preferably sent through the main unit module 30, as a deformation, the first signal can also be sent from the electronic device. The subunit module 10 directly transmits the relevant interface identification information to the electronic device. That is, every module has a communication function with the electronic device.

The docking parts with interface identification information of the main unit module 30 as 001 and 002 are respectively connected to a No. 1 subunit module 10 and a No. 2 subunit module 10, the No. 1 subunit module 10 is connected to a No. 3 subunit module 10 and a No. 4 subunit module 10 through the docking part, the No. 2 subunit module 10 is connected to a No. 5 subunit module 10 and a No. 6 subunit module 10 through the docking part, as an example to illustrate that, preferably the main unit module 30 sends the first electrical signals to notify the subunit module 10 to perform the surface recognition through wireless broadcast information. Different docking parts of the main unit module 30 sent different second signals which may be voltage signals or current signals of different intensities, or electrical signals of different frequency bands. The No. 1 subunit module 10 and the No. 2 subunit module 10 can obtain specific interface identification information of the docking part connected to the main unit module 30 by recognizing different second electrical signals. When the No. 1 subunit module 10 and the No. 2 subunit module 10 receive the second signals, as different docking parts of every unit module have interface identification information, the No. 1 subunit module 10 and the No. 2 subunit module 10 can obtain interface identification information of the docking part connected to the main unit module 30. The No. 1 subunit module 10 first replies to and informs the main unit module 30 of interface identification information of the connected main unit module 30 and the docking part connected to the main unit module 30. After waiting for a while, the No. 2 subunit module 10 replies to the main unit module 30. After the surface recognition of the No. 1 subunit module 10 and the No. 2 subunit module 10, the main unit module 30 stops sending electrical signals and notifies the No. 1 subunit module 10 and the No. 2 subunit module 10 directly connected to the main unit module 30 to send the second electrical signals to the No. 3, 4, 5, 6 subunit module 10 in a time sequence; the No. 1 subunit module 10 first sends the second electrical signals to the No. 3,4 subunit modules 10, in accordance with the foregoing principle, the No. 3,4 subunit modules 10 return relevant interface identification information to the main unit module 30. Then the No. 2 subunit module 10 first sends the second electrical signals to the No. 5,6 subunit modules 10, in accordance with the foregoing principle, the No. 5,6 subunit modules 10 return relevant interface identification information to the main unit module 30. So far, the main unit module 30 obtains the relative position information between the unit modules of the constructed model.

Preferably, the modular robot includes the configuration information which includes the position information. Further preferably including the initial angel information between the two submodules 101, when the two submodules 101 are set at a certain position, the relative angle between the two submodules 101 is 0°, and when the electrical signals control the submodule 101 to rotate relatively, the initial angle information between the two submodules 101 is first obtained so as to send the control signals corresponding to the rotation angle to control their rotation.

Preferably, the main unit module 30 numbers the subunit module 10 after receiving relevant interface identification information transmitted from the subunit module 10 to generate the IDs of every subunit module 10 for convenient communication. The IDs are conveniently used to return the initial angle information between the two submodules 10, and to receive signals to control the subunit module 10 to rotate at a set angle.

Preferably, the configuration information further includes the quantity information representing the number of the subunit modules 10 and/or the type information representing the type of the subunit modules 10. Preferably, every main unit module 30, subunit module 10 and main control module 50 all have type information, and the type information of the same type modules is the same; for example, different main unit modules 30 or subunit modules 10 or main control modules 50 have the same type information. The main unit module 30, subunit module 10 and main control module 50 can be set to have different or same type information according to their functions or structures. The signals fed back by the main unit module 30, subunit module 10 and main control module 50 when electrified have the type information.

It may be understood that the configuration information may include one or more of the position information, the type information, the quantity information and the initial angle information.

It may be understood that the modular robot of this embodiment is applicable to other embodiments. Those skilled in the art can reasonably remove part of the structural functions of the modular robot as required. The surface recognition method disclosed in this embodiment is applicable to other embodiments. The position information of the modular robot can be automatically obtained by the surface recognition.

Figure 8:
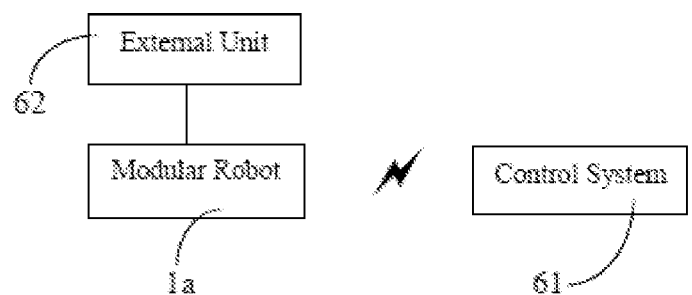
FIG. 8 is a schematic diagram of a module structure of a modular robot system according to a second embodiment of the present invention.

Referring to FIG. 8, the second embodiment of the present invention provides a modular robot system 60, the modular robot system 60 includes a modular robot 1a as described in the first embodiment (follow the number in the first embodiment), and an external unit 62 connected to the modular robot 1a and a control system 61 of the modular robot; the control system 61 of the modular robot is configured to compile and generate an executable program which can be erasably written into the modular robot 1a. The modular robot 1a is wired ore wirelessly connected to the control system 61. Preferably, the control system 61 is disposed on the electronic device described in the first embodiment, such as a computer, a mobile phone, etc. As a deformation, the control system 61 is disposed on the main control module 50. Preferably, the control system 61 is a graphically programmable control system, and the open graphical programming interface through the electronic device allows the user to easily modify the program of controlling the modular robot, thereby obtaining a modular robot 1a with better functional expansibility.

Figure 9:
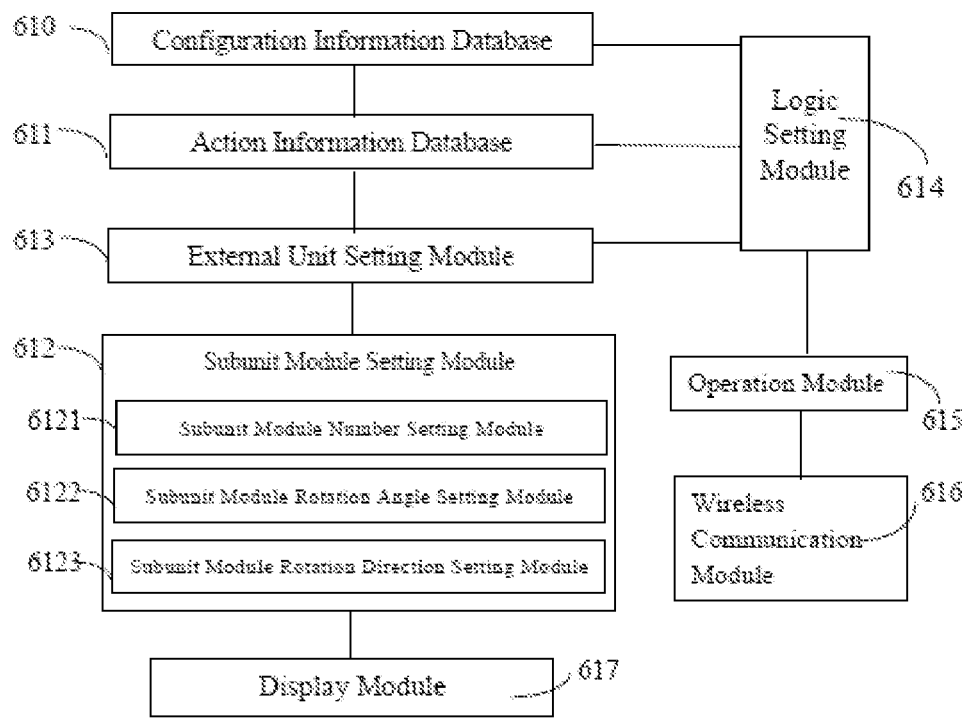
FIG. 9 is a schematic diagram of a detailed module structure of a control system of the modular robot according to a second embodiment of the present invention.

Referring to FIG. 9, the control system 61 includes:
a configuration information database 610, which is configured to store at least one configuration information of the modular robot 1a;
an action information database 611, which is configured to store at least one action information that controls the movement of the modular robot 1a; each action information can control the modular robot 1a to perform one or more frames of actions. The action information in the action information database 611 matches the configuration information of the modular robot 1a in the configuration information database 610. That is, the action information exists corresponding to the configuration information of the modular robot 1a; and
an external unit setting module 613, which is configured to set the execution action of the external unit 62 and/or set the control conditions corresponding to the external unit 62; for example, the sucker is set to perform the sucking action, and when the ultrasonic sensor detects that the distance from the obstacle is less than or equal to 10 cm, it is set to be a condition for the modular robot to stop the movement.

According to the action information and the setting of the external unit setting module 613, the modular robot 1a is controlled to move and/or the external unit 62 is controlled to perform actions.

Specifically, the control system 61 of the modular robot further includes:
a logic setting module 614, used to set the logical relationship between the action information and the execution information and/or the control condition; for example, the external unit 62 includes an ultrasonic sensor and an actuator sucker, and calls an action information of the modular robot 1a moving and an action information of stopping moving, the external unit setting module 613 sets a condition: when the ultrasonic sensor detects the distance from the obstacle is less than or equal to 10 cm, the sucker performs the suction action. The logic setting module 614 is configured to set the relationship between the action information of moving and the action information of stopping moving, and the condition set by the ultrasonic sensor and the action performed by the sucker, for example, to set when the ultrasonic sensor detects the distance from the obstacle is less than 10 cm, the modular robot 1a performs the action information of stopping moving, and the sucker performs the suction action, otherwise, the modular robot 1a performs the action information of moving. It may also control the modular robot 1a to perform the action corresponding to the action information according to the execution result of the actuator;
an operation module 615, used to compile the content set by the logic setting module 614 to generate an executable program, the executable program is used to control the modular robot 1a to work; and
a wireless communication module 616, used to send the executable program to the modular robot 1a.

It may be understood that the configuration information database 610 and the action information database 611 may be an integrated database.

Preferably, the control system 61 further includes a display module 617 at least used to display the three-dimensional simulation model corresponding to the subunit module 10 of the modular robot 1*a* and the number of the subunit module in the three-dimensional simulation model.

Preferably, the display module 617 displays the modular robot 1*a*. Furthermore, the display module 617 is also used to display the number of the subunit module 10, for example, when the cell configuration includes five subunit modules 10, the display module 617 at least displays a three-dimensional simulation model composed of five subunit modules 10, and each subunit module 10 of the three-dimensional simulation model is displayed in number 1, 2, 3, 4, 5, so as to allow the user to distinguish every subunit module 10.

Preferably, the control system 61 further includes a subunit module setting module 612 used to set the rotation information corresponding to the subunit module performing rotation, the rotation information includes one or more of the rotation angles, the rotation direction, the rotation speed, and the rotation time. Specifically, the subunit module setting module 612 includes a subunit module number setting module 6121, a subunit module rotation angle setting module 6122 and a subunit module rotation direction setting module 6123, wherein the subunit module number setting module 6121 is configured to set the number of the subunit module; the subunit module rotation angle setting module 6122 is configured to set the rotation angle of the subunit module 10; the subunit module rotation direction setting module 6123 is configured to set the rotation direction of the subunit module 10. That is, selecting the specific subunit module 10 by inputting the number, and then setting the rotation of the subunit module 10 by inputting the rotation angle and the rotation direction. It may be understood that the subunit module 10, not set by the subunit module setting module, is acquiesce to not rotate between the submodules 101.

Preferably, the modular robot is controlled to move and/or the external unit is controlled to perform actions according to the settings of the action information, the rotation information and the external unit setting module. That is, in the logic setting module, the relationship between the rotation information and the execution action and/or the control condition can be set.

As an option, the generated action information can be set to be stored in the action information database by subunit module setting module 612.

As a deformation, the subunit module number setting module 6121 can be omitted, and the subunit modules 10 are distinguished by color, whether or not to be selected by the user and other ways. As a deformation, the subunit module 10 rotation angle setting module 6122 is omitted. That is, the rotation information may only include the rotation angle.

Preferably, a time module can be set in each module as required to set the execution time of the rotation, the suction, etc.

Figure 10:
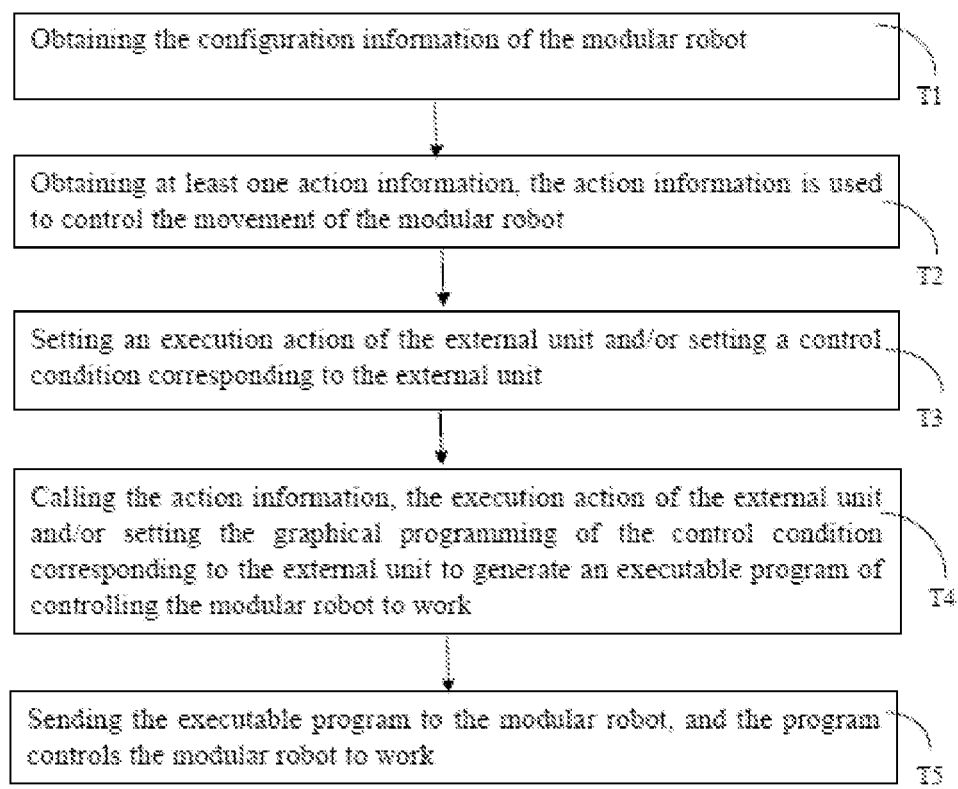
FIG. 10 is a flowchart of a control method of the modular robot according to a third embodiment of the present invention.

Referring to FIG. 10, a third embodiment of the present invention provides a modular robot control method, which includes:

step T1: obtaining the configuration information of the modular robot;

step T2: obtaining at least one action information, the action information is used to control the movement of the modular robot;

step T3: setting an execution action of the external unit and/or setting a control condition corresponding to the external unit;

step T4: calling the action information, the execution action of the external unit and/or setting the graphical programming of the control condition corresponding to the external unit to generate an executable program of controlling the modular robot to work; and step T5: sending an executable program to the modular robot. Specifically, sending the executable program to a control body, and the control body is erasably written by a program and controls the modular robot to work according to the program.

Preferably, the control method of the modular robot includes a step performed before step T4:

Ta: setting a rotation information performed by the subunit module; the rotation information includes one or more of the rotation angle, the rotation direction, the rotation speed, and the rotation time; and calling the action information, the execution action of the external unit and/or setting the graphical programming of the control condition corresponding to the external unit to generate an executable program of controlling the modular robot to work in the step T4.

Preferably, the modular robot control method includes a step performed before step Ta:

Tx: generating a three-dimensional simulation model of the modular robot, the three-dimensional simulation model of the modular robot is the same as the modular robot corresponding to the configuration information obtained in the step T1; and Ty: the subunit modules in the three-dimensional simulation model are numbered;

in the step Ta, different subunit modules are distinguished according to the numbers of the subunit modules so as to input the rotation information. The settings of each subunit module include a number input and a rotation information input. After the user inputs the number of the subunit module, the rotation information input for the number is the rotation information of the subunit module corresponding to the number.

Preferably, the configuration information of the modular robot comes from the configuration information database, the configuration information is obtained by the surface recognition of the modular robot, and the specific method of the surface recognition is consistent with the method disclosed in the first embodiment, which is not repeated here.

Preferably, the action information comes from the action information database, the method for obtaining the action information in the step T2 includes steps:

Q1: the modular robot generates a new configuration by a single frame; preferably, the external force acts on the modular robot to generate a new configuration.

Q2: obtaining the configuration information corresponding to the new configuration by the surface recognition;

Q3: the configuration information of the modular robot before adjustment and the configuration information corresponding to the new configuration are calculated to obtain a motion frame; and the motion frame is stored in the action information database to be an action information corresponding to the cell configuration, or repeating steps Q1-Q3 to obtain a plurality of motion frames, and a plurality of motion frames are integrated to form an action information stored in the action information database.

The modular robot adopted in this method is the modular robot disclosed in the first embodiment, and this method can also adopt the control system disclosed in the second embodiment.

For example, the executable program is generated on an electronic device, and the modular robot is a quadruped robot which includes a body formed by the main control module and four feet formed by splicing the subunit modules; an ultrasonic sensor is connected to the No. 1 plug interface on the main control module. The control method of the modular robot is: obtaining the configuration information of the modular robot, obtaining the action information 1 for controlling the handshake action of the quadruped robot, and the action information 2 for controlling the quadruped robot to be stationary, setting the condition for performing the action information 1 as the ultrasonic sensor detects that the distance between the object (person) and the modular robot is less than or equal to 10 cm, setting the condition for performing the action information 2 as the ultrasonic sensor does not detect that the distance between the object (person) and the modular robot is greater than 10 cm; setting the rotation information of the subunit module so as to control the quadruped robot to perform a bowing action, and setting the bowing action to be performed after completing the action information 2. Compiling and generating an executable program, the program is sent to the control body, and the control body runs the program; the ultrasonic sensor detects the distance from the person in real time, when the ultrasonic sensor detects that the distance between the person and the quadruped robot is less than or equal to 10 cm, the quadruped robot performs the action information 1 to perform a handshake, otherwise, the quadruped robot performs the action information 2 and performs a bowing action after completing the action information 2.

It may be understood that in the present invention, the logic condition that controls the modular robot to perform actions can be a sensor.

Figure 11:
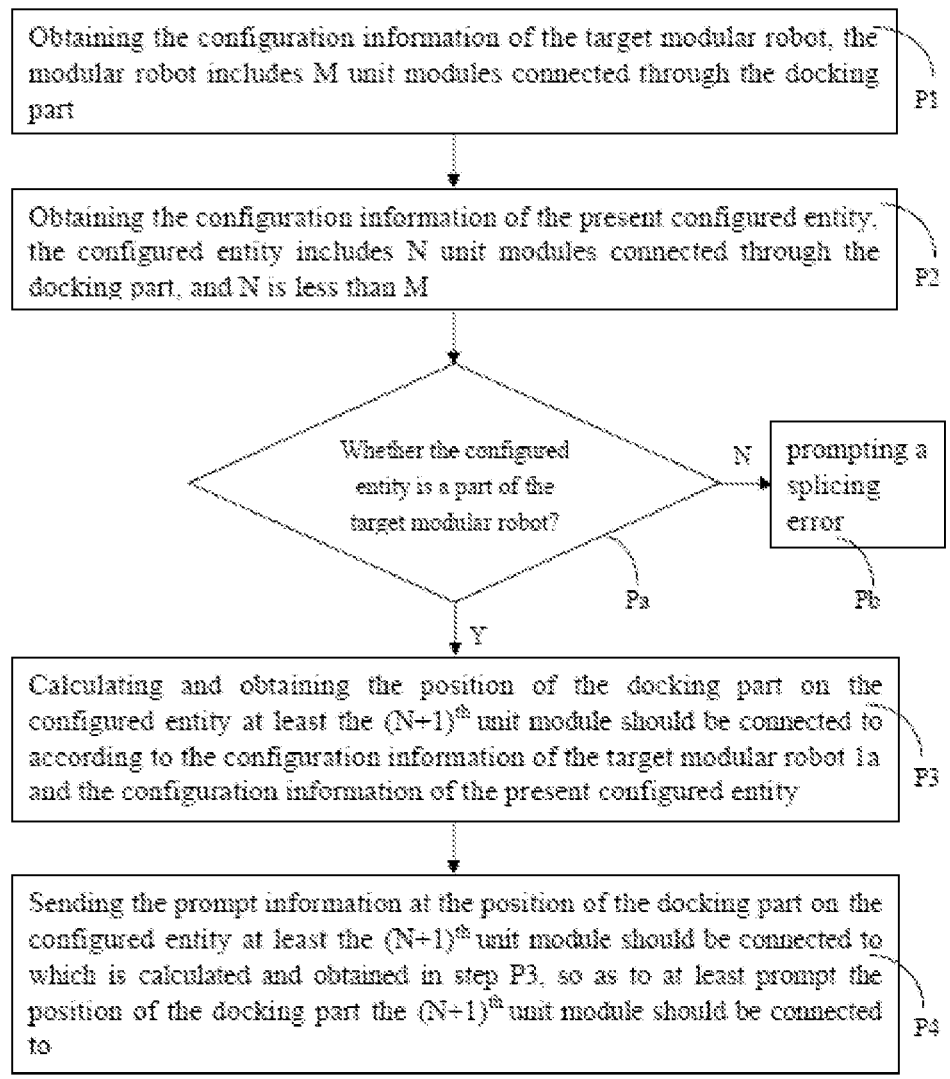
FIG. 11 is a flowchart of a reminding method for building a modular robot according to a fourth embodiment of the present invention.

Referring to FIG. 11, a fourth embodiment of the present invention provides a configuration prompt method of the modular robot, the configuration prompt method of the modular robot can prompt the user to configure the modular robot disclosed in the present invention, which includes:

P1: obtaining the configuration information of the target modular robot, the target modular robot includes M unit modules connected through the docking part;

P2: obtaining the configuration information of the present configured entity, the configured entity includes N unit modules connected through the docking part, and N is less than M;

P3: calculating and obtaining the position of the docking part on the configured entity at least the $(N+1)^{th}$ unit module should be connected to according to the configuration information of the target modular robot 1a and the configuration information of the present configured entity; and P4: sending the prompt information at the position of the docking part on the configured entity at least the $(N+1)^{th}$ unit module should be connected to which is calculated and obtained in the step P3, so as to at least prompt the position of the docking part the $(N+1)^{th}$ unit module should be connected to.

Preferably, the method further includes a step P5: connecting at least the $(N+1)^{th}$ unit module to the configured entity according to the prompt information;

repeating steps P2-P5 to complete the connection between a plurality of unit modules, to obtain the modular robot.

Preferably, in the step P3, calculating and obtaining the positions of the docking part on the configured entity a plurality of the unit modules should be connected to.

The configuration information refers to the information of determining the configuration of the modular robot, at least includes interface identification information representing the connection relationship of unit modules thereof, and further includes the type information representing the type of the unit module and/or the quantity information representing the number of the unit module.

Preferably, the docking part of the unit module provides an indicating function member, in the step P4, controlling the indicating function member to send the indicating information according to the position of the docking part on the configured entity the unit modules should be connected to calculated and obtained in the step 3. The indicating function member may be a lamp, a retractable mechanical structure lamp, preferably an LED lamp.

Preferably, a step is included before step P4: the configuration of the configured entity is displayed by a three-dimensional simulation display screen, in the step P4, the prompt information is expressed by a three-dimensional simulation model, and the expression method includes: displaying in a specific color through a part of the three-dimensional simulation model corresponding to the position of the docking part (including virtual or physical display; or using an indicating symbol to indicate to a part of the three-dimensional simulation model corresponding to the position of the docking part; or demonstrating through a dynamic splicing.

Preferably, the configuration information of the target modular robot in the step P1 comes from a database which stores the configuration information corresponding to a plurality of the modular robots.

Preferably, in order to prevent the user from still splicing improperly under the indication of the prompt information, therefore, a checking step needs to be set, that is, the following is further included between step P2 and step P3:

step Pa: judging the matching of the configured entity and the target modular robot in the step P2; it may be understood that the matching situation of the configured entity and the target modular robot includes the corresponding parts of the configured entity and the target modular robot are completely the same or basically the same, and the meaning of basically the same is that the spliced modular robot can obtain a configuration completely consistent with the target modular robot by means of automatic control; taking the unit module has eight interfaces as an example, the eight interfaces are symmetrically distributed on the two subunit modules, and interface identification information of the interface on one of the unit module is defined as 001, 003, 005, 007, and the four interfaces are arranged successively along circumferential direction. When a unit module of the target modular robot should be connected to an interface 001 of another unit module, but the user connects a unit module to an interface 003 of another unit module when completing the splicing of this part; however, as the interface 001 and the interface 003 are symmetrically distributed, the same configuration as the target modular robot can be obtained by rotating the subunit module 180°, therefore, the configured entity and the target modular robot are considered to be basically the same. Conversely, it is impossible to use means of automatic control, for example, to control the corresponding subunit module to rotate a preset angle to obtain a configuration completely consistent with the target modular robot, it is considered to be mismatched. If the configured entity and the target modular robot match, proceed to step P3; otherwise, proceed to step Pb: prompting a splicing error.

Figure 12A:
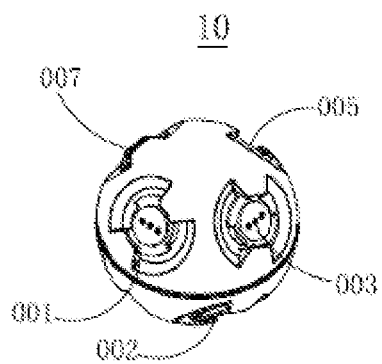
FIGS. 12A and 12B are schematic diagrams of an interface arrangement of the subunit module.
Figure 12B:
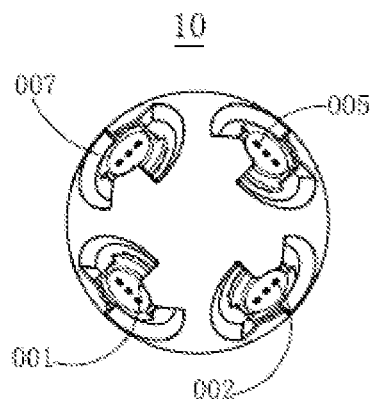
Figure 13A:
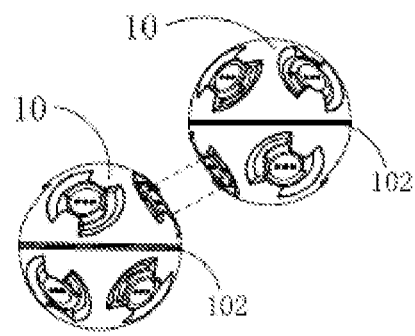
FIGS. 13A and 13B are schematic diagrams of parallel splicing lines and crossed splicing lines when the subunit modules are spliced.
Figure 13B:
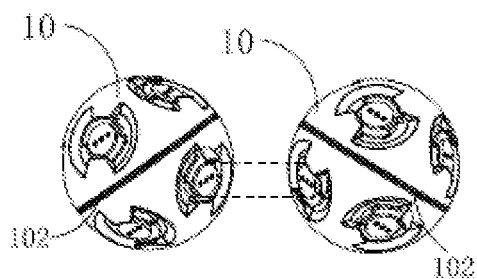

Preferably, when a splicing error occurs, that is, the configuration information of the configured entity and the configuration information of the target modular robot mismatch, namely one or more of the type information, the quantity information and interface identification information mismatch, different types of splicing errors are prompted according to different error information, for example, the user spliced the main unit module at the position where the subunit module should be spliced, and the subunit module and the main unit module are different modules; in this case, a type error is prompted. For example, when interface identification information is incorrect (when the configured entity and the target modular robot are basically the same, interface identification information error is not prompted), there are at least two kinds of prompt error: one is a position error, another is parallel cross error. Referring to FIGS. 12A and 12B, taking the unit module has eight interfaces as an example, the eight interfaces are symmetrically distributed on the two subunit modules, and interface identification information of the interface arranged successively along circumferential direction on the first subunit module of the unit modules therein is defined as 001, 003, 005, 007, and interface identification information of the interface arranged successively along circumferential direction on the second subunit module is 002, 004, 006, 008. The position error includes but is not limited to, for example, when two unit modules should be connected to the 001,002 interfaces of another unit module (adjacent interface of different hemispheres), but wherein one unit module is connected to a second subunit module (different hemispheres) or connected to the 001, 003 interfaces (opposite interface of the same hemispheres), in this case, it is impossible to match the configured entity with the target modular robot by controlling the rotation of the subunit module, and in this case, a position error is prompted. Referring to FIGS. 13A and 13B, a splicing line 102 is at the junction of the two subunit modules, when the two unit modules are spliced on different interfaces, the splicing line 102 of the two unit modules has parallel (as shown in FIG. 13A) and crossed (as shown in FIG. 13B) position relationships; the parallel and crossed position relationships affect the final configuration, for example, when the two unit modules whose splicing lines should be parallel are spliced to crossed splicing lines, consequently, the modular robot will be incorrectly configured or lose some dimensional degrees of freedom, in this case, a parallel cross error is prompted.

Preferably, when the corresponding parts of the configured entity and the target modular robot are basically the same, and the required rotation angle between the two subunit modules is recorded so as to control the modular robot to rotate, the angle is taken into consideration.

In the step P2, the N subunit modules complete the obtaining of the configuration information of the configured entity by surface recognition.

Preferably, the configuration information of the target modular robot in the step P1 comes from a database which stores the configuration information corresponding to a plurality of the modular robots.

It may be understood that the usage occasions of the configuration prompt method of the modular robot provided by the present invention can be as follows: the electronic device provides a database storing the configuration information corresponding to a plurality of the modular robots, the electronic device can communicate with the modular robot, preferably, the modular robot communicates through the main unit module and the subunit module. When the user selects a modular robot from the database in the electronic device, namely step P1 is performed, and the modular robot is displayed in three dimensions; the user assembles according to the modular robot displayed in three dimensions, for example, the user first assembles a subunit module to the main unit module, and before the subunit module is installed, the electronic device performs steps P2-P4; the user installs the subunit module according to the prompt information, namely performs step P5.

As a deformation, the database can also be disposed on the main unit module, and steps P1-P4 are all performed by the main unit module.

Compared with the prior art, the configuration prompt method of the modular robot provided by the present invention can effectively prompt the installation position of the unit module, so as to reduce the assembly error rate when the user reconstructs the modular robot, and to make the reconstruction work simple and easy to proceed. The developer can conveniently open the configuration data of the modular robot through the database, and the user can simply and quickly reconstruct the robot according to the needs of different occasions. In this method, the position of each unit module can be accurately obtained by surface recognition, which is simple, fast and has low hardware requirements. The obtaining of the position ensures that it is possible to correct the user's operation in real time. When the user operates incorrectly, the corresponding splicing error is prompted, and the user can conveniently and quickly know the error type, and then can quickly correct to expedite the process of the reconstruction work.

Figure 14:
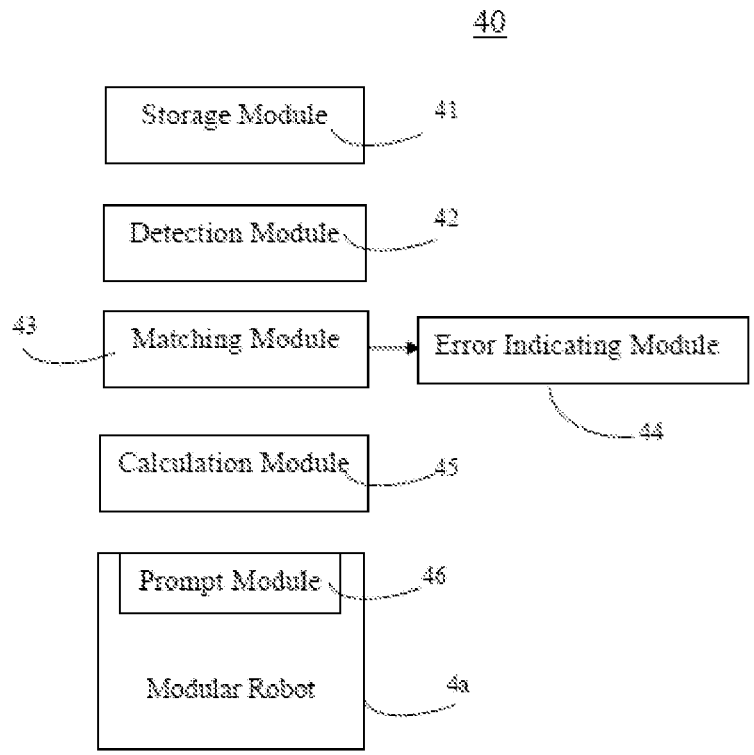
FIG. 14 is a schematic diagram of a module structure of a reminding system for building a modular robot according to a fifth embodiment of the present invention.

Referring to FIG. 14, a fifth embodiment of the present invention provides a configuration prompt system of a modular robot 4a, the modular robot 4a is as disclosed in the first embodiment. A storage module 41 is configured to store the configuration information of the target modular robot 4a and the configured entity; the target modular robot 4a includes M unit modules connected through the docking part; a detection module 42 is configured to obtain the configuration information of the present configured entity, the configured entity includes N unit modules connected through the docking part, and N is less than M; a calculation module 45 is configured to calculate and obtain the position of the docking part on the configured entity at least the $(N+1)^{th}$ unit module should be connected to according to the configuration information of the target modular robot 4a and the configuration information of the present configured entity; a prompt module 46 is configured to send the prompt information at the position of the docking part on the configured entity at least the $(N+1)^{th}$ unit module should be connected to which is calculated and obtained by the calculation module 45, so as to at least prompt the position of the docking part the $(N+1)^{th}$ unit module should be connected to.

One or more of the storage modules 41, the detection module 42, the calculation module 45 and the prompt module 46 can be disposed on the electronic device or on one of the unit modules therein.

Preferably, the prompt module 46 is an indicating function member provided at the docking part. As another option, the prompt module 46 is a display screen, and the configured entity is displayed by a three-dimensional simulation display screen, and a part of the three-dimensional simulation model corresponding to the position of the docking part is displayed in a specific color; or using an indicating symbol to indicate to a part of the three-dimensional simulation model corresponding to the position of the docking part; or demonstrating through a dynamic splicing.

The configuration prompt system of a modular robot 4a further includes a matching module 43 and an error indicating module 44, and the matching module 43 is configured to judge whether the configured entity and the target modular robot match or not; the judging principle of whether matching or not is the same as the first embodiment, which is not repeated here. If the matching module 43 judges that the configured entity and the target modular robot match, the calculation module 45 calculates the position of the docking part on the configured entity the $(N+1)^{th}$ unit module should be connected to according to the configuration information of the target modular robot 4a and the configuration information of the present configured entity. Conversely, when the configured entity and the target modular robot mismatch, the error indicating module 44 is configured to indicate an error, and indicates different types of errors as described in the first embodiment. It may be understood that the error indicating module 44 is disposed in the prompt module 46. It may be understood that in the present invention, the splicing positions of the subunit modules of the same level can be prompted simultaneously or therein a part can be prompted simultaneously, certainly, can be prompted one by one. It may be understood that the modular robot of the present invention can be a complete robot, such as a quadruped robot, or a part of the robot therein, such as one of the legs therein of a quadruped robot.

Figure 15:
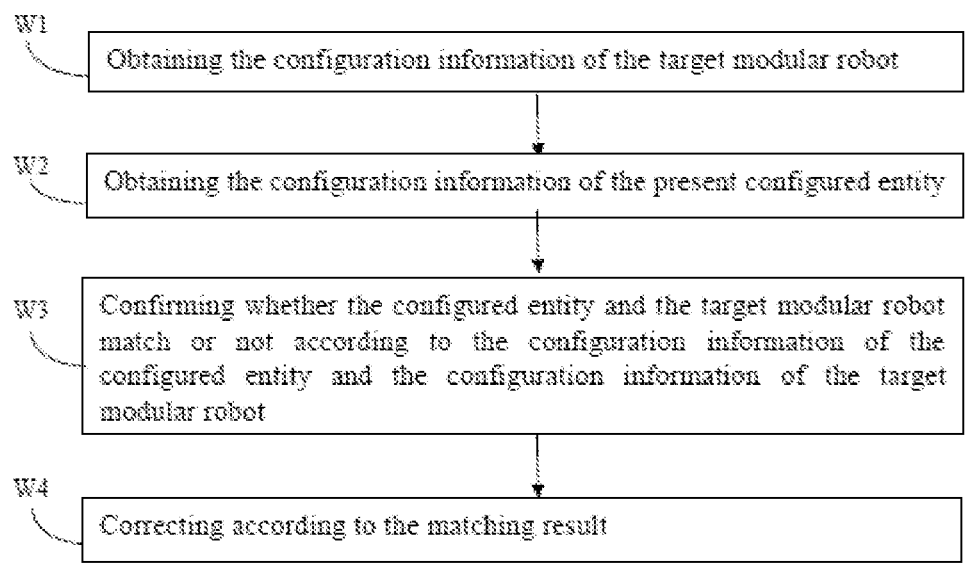
FIG. 15 is a flowchart of a correction method for building a modular robot according to a sixth embodiment of the present disclosure.

Referring to FIG. 15, a sixth embodiment of the present invention provides a correction method of the modular robot, the modular robot can be the modular robot disclosed in the first embodiment, and the correction method includes step:

W1: obtaining the configuration information of the target modular robot, the configuration information of the target modular robot includes one or more of the position information, the module type information and the module quantity information of a plurality of unit modules in the target modular robot;

W2: obtaining the configuration information of the present configured entity, the configuration information of the present configured entity includes one or more of the position information, the module type information and the module quantity information of a plurality of unit modules in the configured entity;

W3: confirming whether the configured entity and the target modular robot match or not according to the configuration information of the configured entity and the configuration information of the target modular robot; and W4: correcting according to the matching result.

In the step W1, the configuration information of the target modular robot may come from a remote terminal, a server, or a database storing the configuration information corresponding to a plurality of the modular robots. The target modular robot includes and is assembled by m unit modules.

In the step W2, the configured entity is an entity configuration that the user takes the target modular robot as the configuration target and intends to assemble a plurality of unit modules into the target modular robot, and the entity configuration may be an assembly configuration of two or more unit modules. In general, the number of the unit modules of the configured entity is less than or equal to the number m of the unit modules of the target modular robot. The action of obtaining the configuration information of the configured entity may be that the remote terminal obtains the position information of each unit module, or a certain unit module obtains the position information of other unit modules and then transmits to the remote terminal. The method of obtaining the position information is preferably the surface recognition.

A plurality of unit modules of the configured entity may include multiple same or different unit modules, when a plurality of unit modules of the configured entity include multiple different unit modules, for example, a plurality of unit modules of the configured entity include a main unit module and multiple subunit modules, the main unit module is configured to communicate with the remote terminal, and after all the subunit modules transmit their respective position information to the main unit module, the main unit module can store or send to the remote terminal.

In the step W3, confirming whether the configured entity and the target modular robot match or not refers to confirming whether the structure of the configured entity is consistent with the structure of the target modular robot, or the structure of the configured entity is a part of the structure of the target modular robot. It may be understood that in the step W4, a corresponding prompt will be obtained according to the matching result.

Step W4 specifically includes the following steps:

W41: providing different prompts according to different matching results; and W42: correcting according to different prompts.

It may be understood that obtaining the configuration information of the configured entity after each unit module is assembled, and matching the configuration information of the configured entity and the configuration information of the target modular robot, and then correcting according to the matching result; or obtaining the configuration information of the configured entity at one time after all the assembly is completed, and matching the configuration information of the configured entity and the configuration information of the target modular robot, and then correcting according to the matching result. As disclosed in the fourth embodiment, different types of splicing errors are prompted according to different error information.

It may also be understood that there is a virtual connection surface at the junction of the two submodules of each unit module, the position relationship of the virtual connection surface of multiple unit modules of the target modular robot has two situations, parallel and cross; The error types of the position information include position error and parallel cross error, convenient for the subsequent description, the two submodules of each unit module are defined as submodule 1 and submodule 2, the submodule 1 provides four docking parts 1, 3, 5, 7, and the submodule 2 provides four docking parts 2, 4, 6, 8, and the four docking parts on submodule 1 and submodule 2 are all symmetrically arranged. For example, a present unit module A and a unit module B are connected, and the unit module B should be connected to the No. 1 docking part on the unit module A in the configuration information of the target modular robot, but the unit module A is connected to other docking parts on the unit module B in the configured entity; in this case, a position error will occur. Another example: a present unit module C and a unit module D, the No. 1 docking part on the unit module C and the No. 1 docking part on the unit module D should be connected in the configuration information of the target modular robot; in this case, the virtual connection surface of the unit module C and the virtual connection surface of the unit module D are parallel, but the No. 2 docking part on the unit module C is connected to the No. 1 docking part on the unit module D in the configured entity, thereby the virtual connection surface of the unit module C and the virtual connection surface of the unit module D are crossed; in this case, a parallel cross error occurs. However, as long as the docking part of the selected unit module D is consistent with the configuration information of the target modular robot, and the four docking parts on the unit module C are symmetrically arranged, after the docking part on the unit module D is selected correctly, and when the unit module C and the unit module D are connected, the four docking parts on the same submodule are connected to the unit module D, the virtual connection surfaces of the unit module C and the unit module D are in a parallel relationship or a crossed relationship; therefore, when the three docking parts 3, 5, 7 on the unit module C are respectively connected to the No. 1 docking part on the unit module D, the virtual connection surface of the unit module C and the virtual connection surface of the unit module D are also parallel; and after a certain angle through the servo submodule 1, the configuration information of the configured entity and the configuration information of the target modular robot are kept consistent. That is, under the premise that no position error occurs, when the four docking parts on the same submodule are connected to adjacent unit modules, the four docking parts can adjust by servo to achieve consistency with the configuration information of the target modular robot.

All in all, the position error is when the subunit module to be assembled is connected to the upper-level subunit module or the main unit module, the docking part on the upper-level subunit module or the main unit module is selected incorrectly. The parallel cross error is that the virtual connection surfaces of two adjacent unit modules are parallel in the target modular robot, while the virtual connection surfaces of two adjacent unit modules are crossed in the configured entity. It may be understood that the matching method can refer to the matching principle disclosed in the fourth embodiment.

A seventh embodiment of the present invention also provides a modular robot control method, when adopting the correction method of the modular robot described in the sixth embodiment to confirm that the configured entity is completely consistent with the target modular robot, the control method of the modular robot further includes the following steps:

W5: obtaining the preset action control information; and

W6: transmitting the preset action control information to the configured entity, and the configured entity performs the action according to the preset action control information.

It may be understood that the remote terminal or the main unit module correspondingly stores the preset action control information according to the configuration information of the target modular robot.

It may be understood that in the step W6, the main unit module individually numbered (ID) each subunit module after receiving the position information transmitted from all subunit modules, and associatively stores the numbers and the position information or the unit modules. When the remote terminal transmits the preset action control information to the main unit module, the main unit module analysis the preset action control information according to the numbers, and correspondingly transmits part of the preset action control information to the subunit module according to the numbers, and the subunit module specifies an action according to the received part of the preset action control information.

When the corresponding parts of the configured entity and the target modular robot are basically the same, the configured entity is considered to match the target modular robot, but the preset action control information corresponds completely to the configuration information of the target modular robot one to one, and the configured entity may not be able to perform part or all of required actions according to the preset action control information. Therefore, the following steps can be performed after step W5:

W5a: comparing the configuration information of the configured entity with the configuration information of the target modular robot to obtain a deformation transformation parameter;

W5b: adjusting the preset action control information according to the deformation transformation parameter to generate the present action control information; and W6a: sending the present action control information to the configured entity, and the configured entity performs the action according to the present action control information.

In this case, step W6 is omitted.

Figure 16:
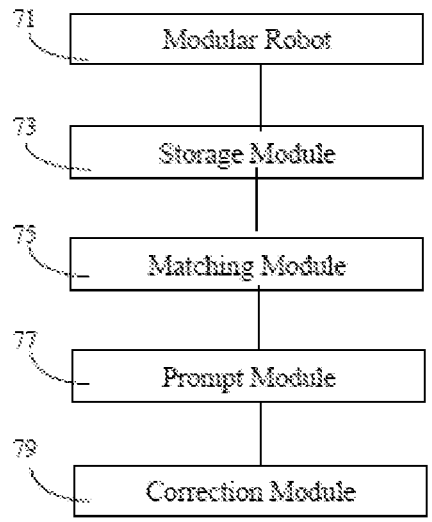
FIG. 16 is a schematic diagram of a module structure of a correction system for building a modular robot according to an eighth embodiment of the present disclosure.

Referring to FIG. 16, an eighth embodiment of the present invention also provides a correction system 70 for configuring a modular robot, the correction system 70 for configuring a modular robot includes:

a modular robot 71, which includes at least two unit modules, and at least two unit modules include two relatively movable submodules; each submodule includes at least a docking part, and the unit modules are connected through the docking part;

a storage module 73, which is configured to store the configuration information of the configured entity and the configuration information of the target modular robot, and the configuration information of the target modular robot includes one or more of the position information, the module type information and the module quantity information of a plurality of unit modules in the target modular robot, the configuration information of the configured entity configuration information of the configured entity includes one or more of the position information, the module type information and the module quantity information of a plurality of unit modules in the configured entity;

a matching module 75, which is configured to confirm whether the configured entity and the target modular robot match or not according to the configuration information of the configured entity and the configuration information of the target modular robot; and a correction module 79, which is configured to correct according to the matching result.

Wherein the configured entity is an entity configuration that the user takes the target modular robot as a target and intends to assemble a plurality of unit modules into the target modular robot. The storage module 73 is connected to the modular robot 71 to obtain the configuration information of the configured entity, the matching module 75 is connected to the storage module 73 to retrieve the configuration information of the configured entity and the configuration information of the target modular robot from the storage module 73, the correction module 79 is connected to the matching module 75 to correct according to the matching result provided by the matching module 75. It may be understood that the storage module 73 is also configured to connect to a remote terminal or a server, and the storage module 73 obtains the configuration information of the target modular robot from the remote terminal or the server.

Furthermore, the correction system 70 for building a modular robot further includes a prompt module, and the prompt module is connected to the matching module 75 and the correction module 79; the prompt module provides different prompts according to different matching results provided by the matching module 75, and the correction module 79 correspondingly corrects according to different prompts provided by the prompt module. The specific matching and prompting method can refer to the sixth embodiment.

Figure 17:
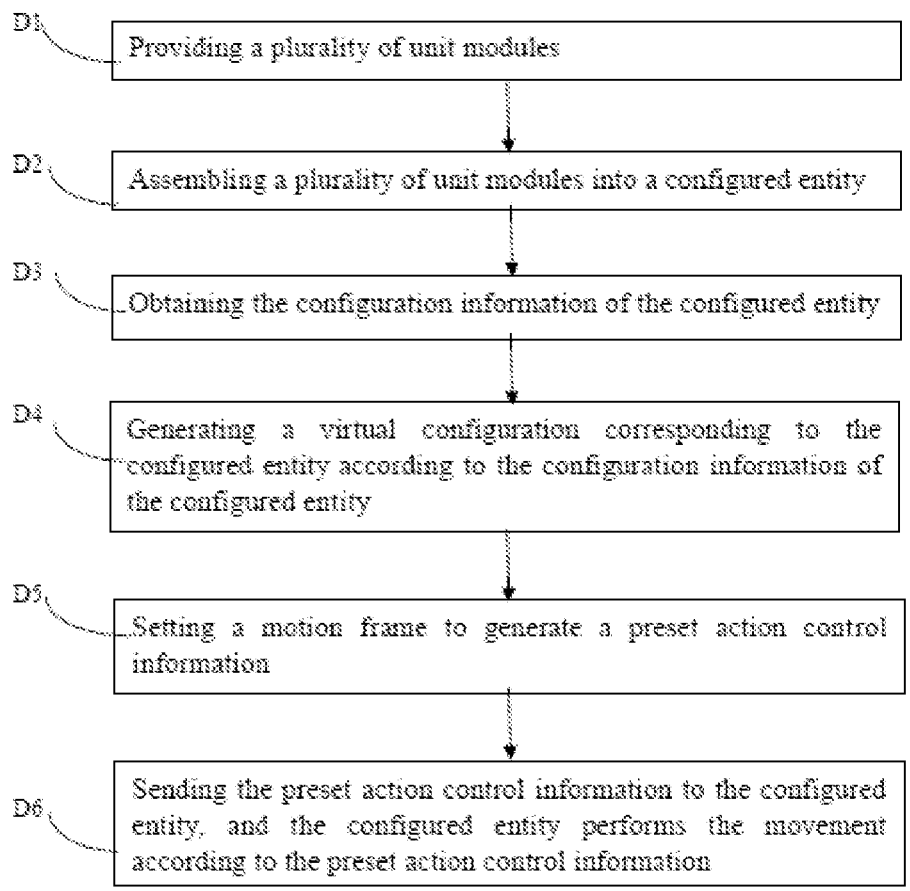
FIG. 17 is a flowchart of a control method of the modular robot according to a ninth embodiment of the present invention.

Referring to FIG. 17, a ninth embodiment of the present invention also provides a modular robot control method, and the modular robot control method includes the following steps:

- D1: providing a plurality of unit modules; preferably including a unit module that can communicate with the remote terminal;
- D2: assembling a plurality of unit modules into a configured entity;
- D3: obtaining the configuration information of the configured entity;
- D4: generating a virtual configuration corresponding to the configured entity according to the configuration information of the configured entity;
- D5: setting a motion frame to generate a preset action control information; and
- D6: sending the preset action control information to the configured entity, and the configured entity performs the movement according to the preset action control information.

It may be understood that in the step D2, a plurality of unit modules are assembled into a modular robot, and the specific structure of the modular robot can be as disclosed in the first embodiment.

It may be understood that in the step D3, the configuration information of the configured entity is uploaded to the remote terminal to obtain the configuration information of the configured entity. Preferably, the configuration information is obtained by surface recognition. The initial configuration information includes one or more of the position information, the module type information, the module quantity information, the initial angle information between the upper and lower submodules and other information defining the connection relationship between adjacent unit modules.

It may be understood that in the step D4, the remote terminal generates a virtual configuration of the modular robot through three-dimensional simulation or three-dimensional modeling according to the obtained configuration information. Step D4 can be omitted.

Generating a preset action control information in the step D5 may specifically include the following steps:

- D51: controlling the two submodules of one or more unit modules to rotate relatively to generate one or more motion frames;
- D52: storing one or more motion frames; and
- D53: generating a preset action control information according to one or more motion frames.

It may be understood that in the step D51 and D52, controlling the two submodules of one or more unit modules to rotate relatively can be performed in the configured entity, and also can be performed in the virtual configuration. For example, the two submodules of a subunit module can be controlled to rotate relative to a certain angle on the entity configuration of the modular robot, and the subunit module can detect the relative rotation angle value of the two submodules and transmit to the main unit module; the main unit module transmits the angle value and the number (ID) of the subunit module and/or the position information of the subunit module to the remote terminal, and the remote terminal determines the identity of the subunit module according to the number of the subunit module and/or the position information of the subunit module, and retrieves the initial angle information of the two submodules of the subunit module and then combines the rotation angle value to calculate the relative angle information between the two submodules after the rotation, and saves the process from the initial angle position to the current angle position as a motion frame; then to rotate the two submodules of another subunit module, or to continue to rotate the two submodules of the same subunit module, through the same information transmission and calculation processing, the remote terminal saves as another motion frame, so as to form a plurality of motion frames. Another example: the two submodules of one or more unit modules in the initial virtual configuration of the modular robot generated by the remote terminal can be selected to rotate a certain angle and saved as a motion frame, and then another subunit module or the same subunit is selected to rotate a certain angle to form another motion frame, so as to obtain a plurality of motion frames. A plurality of motion frames can also occur simultaneously.

It may be understood that step D53 is specifically:

to add, delete or edit one or more motion frames to generate a preset action control information. It may be understood that in the remote terminal, one or more of the rotation time, the rotation speed, the rotation angle and the rotation direction of each motion frame can be edited. For example, one or more motion frames can be selected on the operation interface of the remote terminal, after selecting one of the motion frames, one or more parameter of the rotation angle, the rotation direction, the rotation time and the rotation speed of the motion frame can be edited, or the order of a plurality of motion frames can also be edited, and the preset action control information is finally generated.

In the step D6, after the remote terminal transmits the preset action control information to the main unit module, the main unit module analyzes the preset action control information according to the numbers of different subunit modules, and separately transmits part of the analyzed preset action control information to the corresponding subunit module according to different numbers; the subunit module performs the action after receiving part of the preset action control information. It may be understood that the subunit module monitors the relative angle information between the two submodules in real time during the process of performing the action, and judges whether the action is completed or not according to the detection result. Preferably, after the subunit module determines that the action is completed, the subunit module transmits a signal to the main unit module, and the main unit module transmits the signal to the remote terminal to inform that the subunit module has completed the action; or the subunit module directly transmits the signal to the remote terminal.

Furthermore, the modular robot control method further includes the following steps:

D7: associatively storing the configuration information of the configured entity and the corresponding preset action control information in a database. Afterwards, it is possible to assemble according to the configuration information of the configured entity stored in the database, and to compare the assembled configuration with the configured entity stored in the database and correct; when the configuration information of the assembled configuration is consistent with the initial virtual configuration information stored in the database, the corresponding and associated preset action control information can be directly retrieved from the database to perform the action; or when the database stores enough configuration information of the configured entity, the configuration information of the randomly assembled configuration and the configuration information of the configured entity in the database are matched one by one, and when the configuration information of the randomly assembled configuration is the same as the configuration information of a certain configured entity, the corresponding and associated preset action control information can be directly retrieved from the database to perform the action. This database can be used in the second embodiment.

Figure 18:
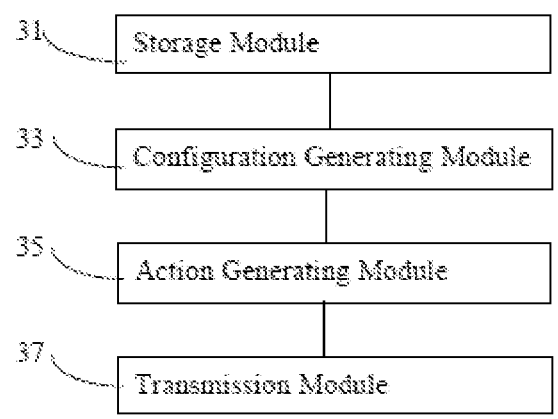
FIG. 18 is a schematic diagram of a module structure of a modular robot control system according to a tenth embodiment of the present disclosure.

Referring to FIG. 18, a tenth embodiment of the present invention also provides a modular robot control system 30 which is configured to control the configured entity spliced by a plurality of unit modules, and the configured entity may be the modular robot disclosed in the first embodiment, and the plurality of unit modules include the unit modules connected to the remote terminal; the modular robot control system 30 includes:

a storage module 31, which is configured to store the configuration information of the configured entity;

a configuration generating module 33, which is configured to generate a virtual configuration of the modular robot according to the configuration information;

an action generating module 35, which is configured to generate a preset action control information; and a transmission module 37, which is configured to transmit the preset action control information to the configured entity, and the configured entity performs the movement according to the preset action control information.

Wherein the storage module 31 is connected to the configured entity to obtain the configuration information of the configured entity, preferably stores the configuration information in the storage module 31 after obtaining the configuration information by surface recognition; the configuration generating module 33 is connected to the storage module 31 to obtain the configuration information from the storage module 31 so as to generate the virtual configuration of the modular robot, the action generating module 35 is connected to the configuration generating module 33 to obtain the initial virtual configuration, and generates the preset motion control information according to the initial virtual configuration; the transmission module 37 is connected to the action generating module 35 and the modular robot, the transmission module 37 obtains the preset action control information from the action generating module 35 and transmits it to the modular robot, and the modular robot performs the action according to the preset action control information.

An eleventh embodiment of the present invention provides a modular robot control system which includes the modular robot as described in the first embodiment and a memorizer, and the memorizer stores one or more programs, wherein one or more programs are used to perform the method disclosed in any of the above embodiments, etc.

The foregoing descriptions are merely preferred embodiments of the present invention, and are not intended to limit the present invention. Within the principles of the present invention, any modifications, equivalent substitutions, improvements, etc., are within the protection scope of the present invention.

The invention claimed is:

1. A modular robot, wherein the modular robot includes at least two unit modules, the at least two unit modules include at least a subunit module, and the subunit module includes at least two connected submodules; the two submodules can be controlled by electrical signals to rotate relatively, to change the modular robot configuration, and every unit module provides at least a docking part, the unit modules are connected through the docking part; different docking parts of every unit module have interface identification information, the interface identification information of every docking part can be recognized, and the position information of the unit module is obtained by recognizing interface identification information of docking parts of connected unit modules;

the modular robot further includes a main control module which provides at least a docking part, the main control module and the subunit module are connected through the docking part; the subunit module directly connected to the main control module is defined as a first-level subunit module;

the main control module sends a first electrical signal to notify the unit module to prepare for the recognition of interface identification information;

different docking parts of the main control module send different second electrical signals or send second electrical signals based on a time sequence;

the first-level subunit module confirms interface identification information of the connected main control module according to the second electrical signals the first-level subunit module receives;

the first-level subunit module obtains interface identification information of the docking part connected to the main control module according to the docking part receiving second electrical signals;

the first-level subunit module sends interface identification information of the main control module and the docking part connected to the main control module to the main control module through wired or wireless transmission.

2. A modular robot according to claim 1, wherein the subunit module further includes an angle measuring device and a control chip, the angle measuring device senses the relative rotation between two submodules and generates sensing signals, and the control chip controls the rotation between submodules to cease or run according to sensing signals.

3. A modular robot according to claim 1, wherein the two submodules of the subunit module respectively include a first housing and a second housing which are rotatably connected by a multi-stage bearing assembly, and the two submodules can rotate relatively under external force.

4. A modular robot according to claim 1, wherein the unit modules are connected mechanically and electrically through the docking part, the unit module further includes a control chip and has a plurality of docking parts wherein different docking parts are connected to different pins of the control chip, and the unit module sends different electrical signals through the docking part or sends electrical signals to the connected unit module based on a time sequence, so that interface identification information of docking parts can be recognized by connected unit modules thereof.

5. A modular robot according to claim 4, wherein from the main control module to the free end of the modular robot, to recognize interface identification information of docking parts of adjacent module units step by step and to obtain the position information of the modular robot.

6. A modular robot according to claim 5, wherein the main control module provides at least a plug interface connected electrically to the main control module, wherein the plug interface is used for pluggable connection with the external unit.

7. A modular robot according to claim 5, wherein the subunit module connected to the first-level subunit module is defined as a second-level subunit module, and the subunit module connected to the $M^{th}$-level subunit module is defined a $(M+1)^{th}$-level subunit module, M being an integer greater than or equal to 1; the process of obtaining the position information of the modular robot is: different docking parts of the $M^{th}$-level subunit module send different second electrical signals or send second electrical signals based on a time sequence to the connected $(M+1)^{th}$-level subunit module; the $(M+1)^{th}$-level subunit module confirms interface identification information of the connected $M^{th}$-level main control module according to the second electrical signals the $(M+1)^{th}$-level subunit module receives; the $(M+1)^{th}$-level subunit module obtains interface identification information of the docking part connected to the $M^{th}$-level main control module according to the docking part receiving second electrical signals; the $(M+1)^{th}$-level subunit module sends interface identification information of the $M^{th}$-level main control module and the docking part connected to the $M^{th}$-level main control module to the main control module through wired or wireless transmission.

8. A modular robot according to claim 1, wherein the modular robot further includes a wheel, the wheel also includes the docking part, and the subunit module and the wheel are detachably connected to each other through the docking part; when the docking parts are connected, the two docking parts electrically conduct and/or transmit signals.

9. A modular robot system, wherein the modular robot system includes a modular robot according to claim 1, and an external unit connected to the modular robot and a control system, the control system includes:
- a configuration information database, which is configured to store configuration information to the modular robot;
- an action information database, which is configured to store at least an action information controlling the movement of the modular robot;
- an external unit setting module, which is configured to set the performance action of the external unit and/or setting the control condition corresponding to the external unit;

and to control the modular robot to move and/or the external unit to perform actions according to the setting of the action information and the external unit setting module.

10. A modular robot system according to claim 9, wherein the modular robot control system further includes: a logic setting module, which is configured to set the logical relation between the action information and the performance action and/or the control condition; an operation module, which is configured to compile the setting content of the logic setting module to generate an executable program which is used for controlling the work of the modular robot.

11. A modular robot control method, wherein the modular robot control method includes the following steps:
- T1: assembling a plurality of unit modules into a constructed entity which is the modular robot as claimed in the claim 1;
- T2: controlling the two submodules of one or more subunit modules to rotate relatively to generate one or more motion frames;
- T3: generating preset action control information according to one or more motion frames; and
- T4: transmitting the preset action control information to the modular robot, such that the modular robot performs an action according to the preset action control information.

* * * * *